US011899129B2

(12) United States Patent
Subburaj et al.

(10) Patent No.: US 11,899,129 B2
(45) Date of Patent: Feb. 13, 2024

(54) METHODS AND APPARATUS TO TEST RADAR INTEGRATED CIRCUITS

(71) Applicant: Texas Instruments Incorporated, Dallas, TX (US)

(72) Inventors: Karthik Subburaj, Bangalore (IN); Zahir Ibrahim Parkar, Bangalore (IN); Krishnanshu Dandu, Allen, TX (US); Vashishth Dudhia, Ahmedabad (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/989,401

(22) Filed: Nov. 17, 2022

(65) Prior Publication Data

US 2023/0088361 A1 Mar. 23, 2023

Related U.S. Application Data

(62) Division of application No. 16/428,576, filed on May 31, 2019, now Pat. No. 11,513,190.

(51) Int. Cl.
*G01S 7/40* (2006.01)
*G01S 13/34* (2006.01)
*G01S 7/35* (2006.01)

(52) U.S. Cl.
CPC ............ *G01S 7/4056* (2013.01); *G01S 7/352* (2013.01); *G01S 13/34* (2013.01); *G01S 7/356* (2021.05)

(58) Field of Classification Search
CPC ........ G01S 7/4056; G01S 7/352; G01S 13/34; G01S 7/356; H04B 17/11; H04B 17/14; H04B 17/21
See application file for complete search history.

(56) References Cited

U.S. PATENT DOCUMENTS 5,160,933 A * 11/1992 Hager ............... G01S 13/18
342/120
5,432,516 A * 7/1995 Cherry ............... G01S 7/4056
342/170

(Continued)

FOREIGN PATENT DOCUMENTS

EP 3343243 7/2018
JP 2014169866 9/2014

OTHER PUBLICATIONS

International Search Report, International Patent Application No. PCT/US2020/035089, dated Aug. 20, 2020.

*Primary Examiner* — Peter M Bythrow
(74) *Attorney, Agent, or Firm* — Michael T. Gabrik; Frank D. Cimino

(57) ABSTRACT

Methods, apparatus, systems and articles of manufacture are disclosed to test RADAR integrated circuits. A radar circuit comprising a local oscillator (LO), a transmitter coupled to the LO and configured to be coupled to a transmission network, a receiver configured to be coupled to the transmission network, and a controller coupled to the LO, the transmitter, and the receiver, the controller to cause the LO to generate a frequency modulated continuous waveform (FMCW), cause the transmitter to modulate the FMCW as a modulated FMCW, cause the transmitter to transmit the modulated FMCW via the transmission network and the receiver to obtain a received FMCW from the transmission network, and in response to obtaining the received FMCW from the receiver, generate a performance characteristic of the radar circuit based on the received FMCW.

20 Claims, 9 Drawing Sheets

(56) References Cited

U.S. PATENT DOCUMENTS

| | | | | |
|---|---|---|---|---|
| 5,841,393 | A * | 11/1998 | Saito | G01S 13/345 |
| | | | | 342/165 |
| 7,724,182 | B2 * | 5/2010 | Inoue | G01S 7/4004 |
| | | | | 342/172 |
| 9,166,706 | B2 | 10/2015 | Forstner | |
| 9,910,135 | B2 * | 3/2018 | Jenkins | G01S 13/931 |
| 10,061,015 | B2 | 8/2018 | Breen et al. | |
| 10,097,287 | B1 * | 10/2018 | Schat | G01S 7/354 |
| 10,284,236 | B1 * | 5/2019 | Trotta | H04B 1/30 |
| 10,429,493 | B2 | 10/2019 | Ginsburg et al. | |
| 11,269,055 | B2 * | 3/2022 | Onic | G01S 13/34 |
| 11,513,190 | B2 * | 11/2022 | Subburaj | G01S 7/4056 |
| 2012/0050094 | A1 * | 3/2012 | Nakabayashi | G01S 7/4008 |
| | | | | 342/174 |
| 2012/0126821 | A1 * | 5/2012 | Forstner | G01R 31/2822 |
| | | | | 455/226.2 |
| 2014/0340254 | A1 * | 11/2014 | Hesse | G01S 7/4008 |
| | | | | 342/175 |
| 2015/0362584 | A1 * | 12/2015 | Jenkins | G01S 13/931 |
| | | | | 342/171 |
| 2016/0245909 | A1 * | 8/2016 | Aslett | G01S 7/4056 |
| 2016/0266239 | A1 * | 9/2016 | Pavao-Moreira | G01S 13/34 |
| 2016/0306034 | A1 * | 10/2016 | Trotta | G01S 7/006 |
| 2016/0334503 | A1 * | 11/2016 | Ginsburg | G01S 7/4056 |
| 2017/0090014 | A1 * | 3/2017 | Subburaj | G01S 7/4056 |
| 2017/0090015 | A1 * | 3/2017 | Breen | G01S 7/032 |
| 2018/0115371 | A1 * | 4/2018 | Trotta | H04B 1/38 |
| 2018/0267144 | A1 * | 9/2018 | Lin | G01S 7/42 |
| 2019/0235050 | A1 * | 8/2019 | Maligeorgos | G01S 7/032 |
| 2019/0242973 | A1 * | 8/2019 | Schat | G01S 7/4021 |

* cited by examiner

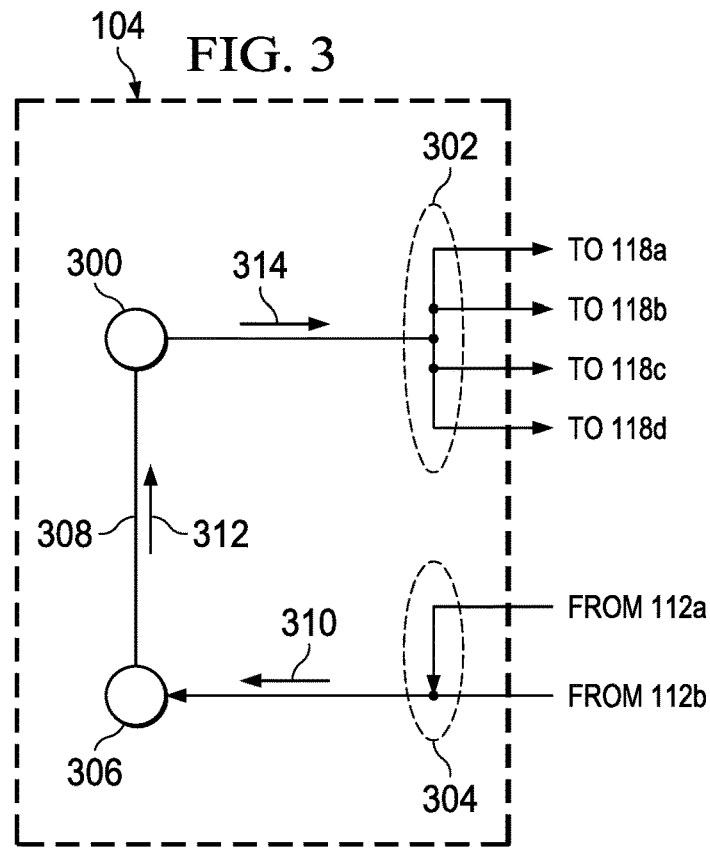
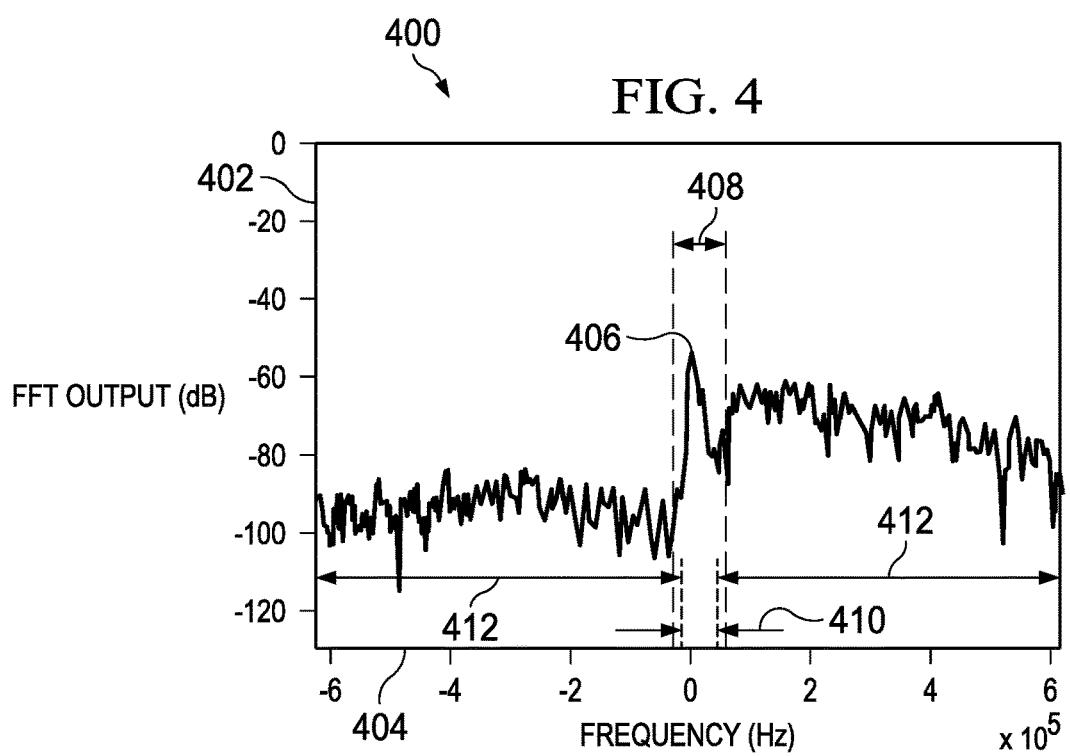

METHODS AND APPARATUS TO TEST RADAR INTEGRATED CIRCUITS

This application is a divisional of U.S. patent application Ser. No. 16/428,576, filed May 31, 2019, scheduled to issue as U.S. Pat. No. 11,513,190, on Nov. 29, 2022, which is hereby incorporated by reference herein in its entirety.

FIELD OF THE DISCLOSURE

This disclosure relates generally to radar systems on a chip (SoC), and, more particularly, to methods and apparatus to test radar integrated circuits.

BACKGROUND

In recent years, manufacturers of integrated circuits (ICs) have developed techniques to manufacture compact ICs that incorporate components of a computer or other electronic system. Such ICs are referred to as Systems on a Chip, or SoCs. Often times, such SoCs include central processing units (CPUs), memory, input/output ports and secondary storage, all on the same substrate. Depending on the application, the SoC may include digital, analog, mixed-signal, radio frequency (RF), or other signal processing functions.

BRIEF DESCRIPTION OF THE DRAWINGS

FIG. 3 is a block diagram showing further detail of an example transmission network of FIG. 1.

FIG. 4 is a graphical illustration of an example fast Fourier transform (FFT) output versus frequency plot.

The figures are not to scale. In general, the same reference numbers will be used throughout the drawing(s) and accompanying written description to refer to the same or like parts.

Figure 1:
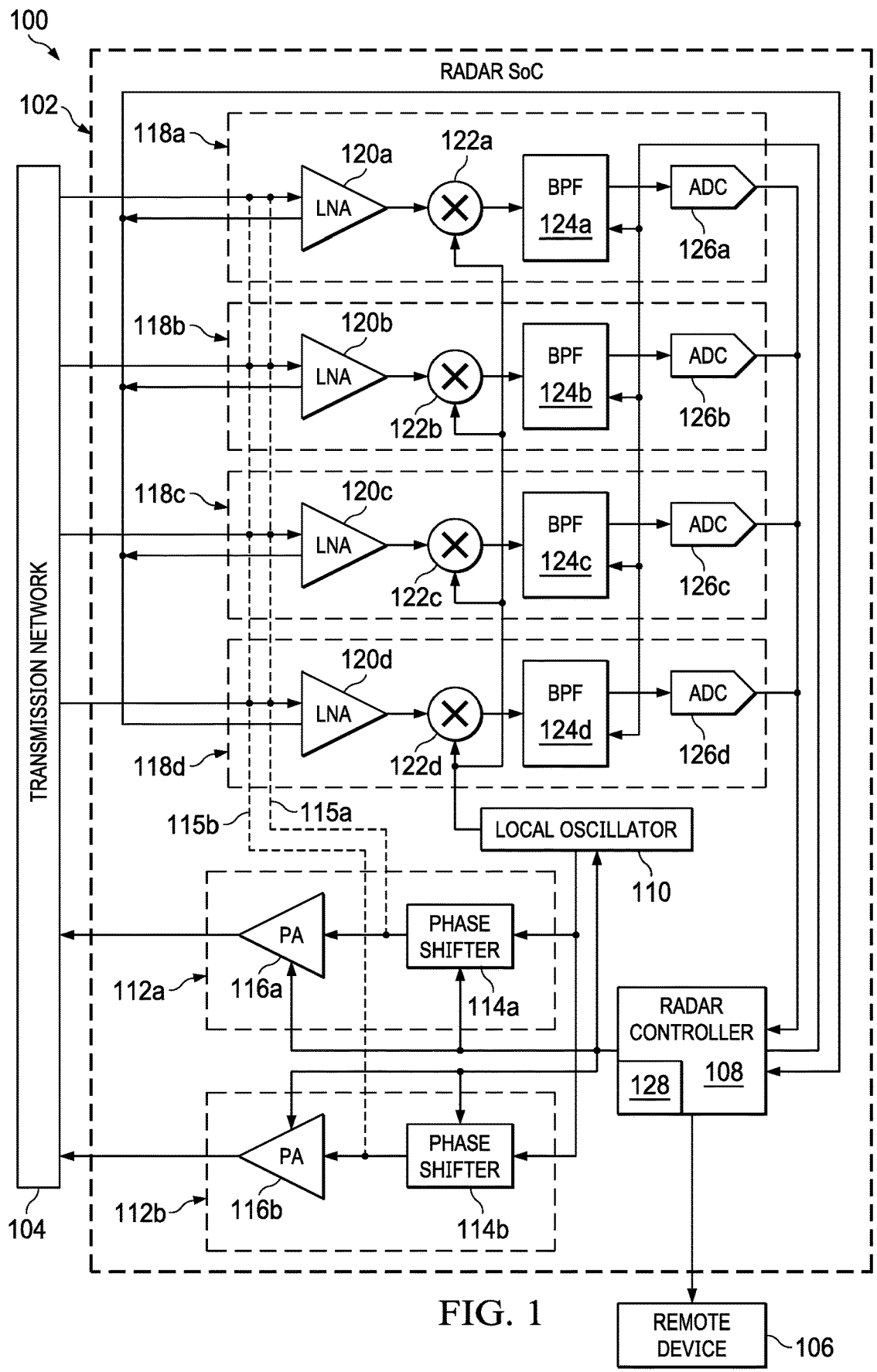
FIG. 1 is a block diagram of an example radar SoC test system.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Examples disclosed herein provide methods, apparatus, and articles of manufacture to test RADAR integrated circuits at production. The examples disclosed herein provide a radar circuit comprising a local oscillator (LO), a transmitter coupled to the LO and configured to be coupled to a transmission network, a receiver configured to be coupled to the transmission network, and a controller coupled to the LO, the transmitter, and the receiver, the controller to cause the LO to generate a frequency modulated continuous waveform (FMCW), cause the transmitter to modulate the FMCW as a modulated FMCW, cause the transmitter to transmit the modulated FMCW via the transmission network and the receiver to obtain a received FMCW from the transmission network, and in response to obtaining the received FMCW from the receiver, generate a performance characteristic of the radar circuit based on the received FMCW.

In recent years, manufacturers of ICs have developed manufacturing techniques to manufacture compact ICs that incorporate most or all components of a computer or other electronic system. Such ICs are referred to as SoCs. Often times, such SoCs include CPUs, memory, input/output ports and secondary storage, all on the same substrate. Depending on the application, the SoC may include digital, analog, mixed-signal, radio frequency (RF), or other signal processing functions.

There are many advantages to using SoC solutions rather than a distributed architecture. For example, using SoC solutions allows for a smaller area on a printed circuit board (PCB) being consumed as opposed to an equivalent distributed solution. Another advantage of using SoC solutions is that such solutions consume less power than distributed solutions because they are integrated on a single substrate. While there are many advantages to using SoC solutions, the individual SoCs may be difficult to test. It is important that a manufacturer of any SoC test the SoC to ensure the desired functionality prior to sale and or use in applications for consumers. Particularly in radio detection and ranging (RADAR) SoC applications, testing for proper functionality may be very difficult and/or expensive.

Some methods test RADAR SoCs and/or other radar circuits by integrating the individual RADAR SoCs with a larger test system. For example, a manufacturer may test individual RADAR SoCs using expensive test equipment to produce the necessary signals to confirm the proper operation of the RADAR SoC. In addition to the expense, the tests that are run to confirm operation may be lengthy and slow down the production process. Other testing systems may require the production of PCB system to test the RADAR SoC. For example, such a PCB system integrates antennas, power supplies, and other modules to facilitate the testing of the RADAR SoC. A drawback to such a test system is that if the RADAR SoC is faulty, the manufactured PCB and the components integrated on the PCB must be discarded. Such a testing system is costly and increases the time it takes to test RADAR SoCs (e.g., reduces the rate at which RADAR SoCs can be tested) because the PCBs must be manufactured and the RADAR SoCs must be soldered to the PCBs before testing can commence.

Additionally, some testing methods may not account for inter-channel imbalances in the RADAR SoC, intra-chip leakage in the RADAR SoC, corruption by the baseband circuitry, and other performance characteristics that may prove crucial to the proper functionality of a RADAR SoC.

To improve upon methods that are costly, slow, and fail to address crucial performance characteristics of a RADAR SoC, examples disclosed herein provide methods, apparatus, and articles of manufacture to test individual RADAR SoCs at production without the need for expensive test equipment or customized PCB designs to test the RADAR SoC. Rather, many examples disclosed herein allow for a RADAR SoC to be tested at production without additional peripheral active electrical equipment. Examples disclosed herein allow for testing of a RADAR SoC to be tested at production to verify the correct functionality of the RADAR SoC. Various examples disclosed herein allow for a RADAR SoC to be tested at production to confirm that that the intra-channel imbalance, baseband corruption, intra-chip leakage and other performance characteristics meet desired specifications without the need for peripheral active electrical test equipment.

As used herein, "at production" refers to at a point during the production process of an IC. For example, the production process involves many steps from purifying silicon to storing and/or transporting completed ICs to a customer. The production process begins when a silicon ingot is purified. After purifying the silicon ingot, wafers are cut from the ingot and polished. The surfaces of the wafers are coated with a layer of silicon dioxide or any other suitable insulating base. Next a photoresist material is spread upon the surface of the wafers. The wafers are then irradiated with light to imprint a mask (e.g., a circuit design) for the first layer of the IC. The areas of the photoresist that have not dissolved from the irradiation are then doped or chemically etched to create positively doped or negatively doped regions. The process of masking and doping is repeated for the remaining layers of the IC. Finally, the individual ICs are cut from the wafers and bonded to their mounting packages. The ICs are then tested to determine proper functionality. Those that pass the tests are determined to have been manufactured properly and are prepared for storage or delivery to customers while those that do not are determined to not have been manufactured properly and are removed from the production line.

FIG. 1 is a block diagram of an example RADAR SoC test system 100. The RADAR SoC test system 100 includes an example RADAR SoC 102, an example transmission network 104, and an example remote device 106. In the example of FIG. 1, the example RADAR SoC 102 includes a RADAR controller 108, an example local oscillator (LO) generator 110, a first transmitter 112a, a second transmitter 112b, a first receiver 118a, a second receiver 118b, a third receiver 118c, and a fourth receiver 118d.

In the example of FIG. 1, the first transmitter 112a includes a first phase shifter 114a and a first power amplifier (PA) 116a. The second transmitter 112b includes a second phase shifter 114b and a second power amplifier (PA) 116b. The first receiver 118a includes a first low noise amplifier (LNA) 120a, a first signal mixer 122a, a first filter 124a, and a first analog-to-digital converter (ADC) 126a. The second receiver 118b includes a second low noise amplifier (LNA) 120b, a second signal mixer 122b, a second filter 124b, and a second analog-to-digital converter (ADC) 126b. The third receiver 118c includes a third low noise amplifier (LNA) 120c, a third signal mixer 122c, a third filter 124c, and a third analog-to-digital converter (ADC) 126c. The fourth receiver 118d includes a fourth low noise amplifier (LNA) 120d, a fourth signal mixer 122d, a fourth filter 124d, and a fourth analog-to-digital converter (ADC) 126d. The RADAR controller 108 includes machine readable instructions 128.

In the illustrated example of FIG. 1, the RADAR controller 108 is coupled to the LO 110, the first phase shifter 114a, the first PA 116a, the second phase shifter 114b, the second PA 116b, the first LNA 120a, the second LNA 120b, the third LNA 120c, the fourth LNA 120d, the example first filter 124a, the example second filter 124b, the example third filter 124c, the example fourth filter 124d, the first ADC 126a, the second ADC 126b, the third ADC 126c, the fourth ADC 126d, and the remote device 106. In the example of FIG. 1, the LO 110 is coupled to the first signal mixer 122a, the second signal mixer 122b, the third signal mixer 122c, the fourth signal mixer 122d, the first phase shifter 114a, the second phase shifter 114b, and the RADAR controller 108.

In the illustrated example of FIG. 1, the first phase shifter 114a is coupled to the LO 110, the first PA 116a, and the RADAR controller 108. In the example of FIG. 1, the first PA 116a is coupled to the first phase shifter 114a, the transmission network 104, and the RADAR controller 108. In the example of FIG. 1, the second phase shifter 114b is coupled to the LO 110, the second PA 116b, and the RADAR controller 108. In the example illustrated in FIG. 1, the second PA 116b is coupled to the second phase shifter 114b, the transmission network 104, and the RADAR controller 108.

The transmission network 104 may be part of a test socket, and elements of the RADAR SoC 102 may be coupled to the transmission network 104 by inserting the RADAR SoC 102 into the test socket for validation. In the illustrated example of FIG. 1, the transmission network 104 is coupled to the first PA 116a, the second PA 116b, the first LNA 120a, the second LNA 120b, the third LNA 120c, and the fourth LNA 120d. In the example the remote device 106 is coupled to the RADAR controller 108. In the example illustrated in FIG. 1, the first LNA 120a is coupled to the transmission network 104, the first signal mixer 122a, and the RADAR controller 108. In the example of FIG. 1, the first signal mixer 122a is coupled to the first filter 124a and the first LNA 120a. In the illustrated example of FIG. 1, the first filter 124a is coupled to the first ADC 126a, the first signal mixer 122a, and the RADAR controller 108. In the example the first ADC 126a is coupled to the first filter 124a and the RADAR controller 108.

In the illustrated example of FIG. 1, the second LNA 120b is coupled to the transmission network 104, the second signal mixer 122b, and the RADAR controller 108. In FIG. 1, the second signal mixer 122b is coupled to the second filter 124b and the second LNA 120b. In the example of FIG. 1, the second filter 124b is coupled to the second ADC 126b, the second signal mixer 122b, and the RADAR controller 108. In the example the second ADC 126b is coupled to the second filter 124b and the RADAR controller 108. In FIG. 1, the third LNA 120c is coupled to the transmission network 104, the third signal mixer 122c, and the RADAR controller 108. In the example illustrated in FIG. 1, the third signal mixer 122c is coupled to the third filter 124c and the third LNA 120c. In FIG. 1, the third filter 124c is coupled to the third ADC 126c, the third signal mixer 122c, and the RADAR controller 108. In the example the third ADC 126c is coupled to the third filter 124c and the RADAR controller 108. In FIG. 1, the fourth LNA 120d is coupled to the transmission network 104, the fourth signal mixer 122d, and the RADAR controller 108. In the example of FIG. 1, the fourth signal mixer 122d is coupled to the fourth filter 124d and the fourth LNA 120d. In the example illustrated in FIG. 1, the fourth filter 124d is coupled to the fourth ADC 126d, the fourth signal mixer 122d, and the RADAR controller 108. In the example the fourth ADC 126d is coupled to the fourth filter 124d and the RADAR controller 108.

In the illustrated example of FIG. 1, the transmission network 104 is a passive network that includes transmission lines, combiners, and/or splitters. The transmission network 104 includes transmission lines individually coupled to the first transmitter 112a and the second transmitter 112b. The transmission network 104 additionally includes transmission lines individually coupled the first receiver 118a, the second receiver 118b, the third receiver 118c, and the fourth receiver 118d. In the transmission network 104, the individual transmission lines coupled to the first transmitter 112a and the second transmitter 112b are combined into a single transmission line by a combiner. In the transmission network 104, the single transmission line is split into two transmission lines by a splitter. In the example, each of the two transmission lines are split by a respective splitter into two additional transmission lines. Thus, in the example, each of the four individual transmission lines split from the single transmission line are coupled to the first receiver 118a, the second receiver 118b, the third receiver 118c, and the fourth receiver 118d, respectively.

In the illustrated example of FIG. 1, the remote device 106 is a device that in response to a status indication from the RADAR controller 108, removes a RADAR SoC (e.g., the RADAR SoC 102) from a production line, forwards the RADAR SoC to be shipped and/or stored, thereby causes the RADAR SoC to be shipped and/or stored, removes the RADAR SoC from a production line, or thereby causes the RADAR SoC to be removed from the production line. In FIG. 1, the remote device 106 includes a robotic arm. Additionally or in the alternative, the remote device 106 may include a control computer at a test station, a processor platform, a personal computing device, or any other suitable device for the application.

In the illustrated example of FIG. 1, the RADAR controller 108 controls the operation of the RADAR SoC 102 and facilitates testing of the RADAR SoC 102.

In the illustrated example of FIG. 1, the LO 110 is a device that generates a signal to transmit via one or more of the first transmitter 112a or the second transmitter 112b based on a signal from the RADAR controller 108. For example, the LO 110 may include a digital-to-analog converter (DAC), a voltage controlled oscillator, and a bandpass filter. In such an example, the DAC converts signals (e.g., control signals) from the RADAR controller 108 to analog voltages to control the voltage controlled oscillator. Additionally, in such an example, the output of the voltage controlled oscillator may be filtered by the bandpass filter to remove high frequency spikes and unwanted harmonics, the output of the bandpass filter is then output from the LO 110. In the illustrated example, the LO 110 is controlled by the RADAR controller 108. The LO 110, in response to a signal from the RADAR controller 108, generates continuous waveforms. In other examples, the LO 110 is any device that generates a frequency to be transmitted by the first transmitter 112a and the second transmitter 112b.

In the illustrated example of FIG. 1, each of the first phase shifter 114a and second phase shifter 114b is a device that adjusts the phase of the signal received from the LO 110. For example, each of the phase shifters 114a, 114b may include a passive analog phase shifter. In other examples, each of the phase shifters 114a, 114b includes any phase shifter that is suitable to the application. In the example of FIG. 1, each of the example phase shifters 114a, 114b includes the functionality to be enabled and/or disabled based on a signal (e.g., a control signal) from the RADAR controller 108. Additionally, each of the example phase shifters 114a, 114b includes the functionality to adjust the phase of the input signal based on a signal (e.g., a control signal) from the RADAR controller 108 to adjust the frequency of the input signal. For example, each of the phase shifters 114a, 114b vary the phase of the respective output signals with respect to the signal received from the LO 110 at a constant rate to introduce a corresponding frequency shift on the respective output signals. Additionally, the first phase shifter 114a is togglable to change the coupling between the first phase shifter 114a and the first PA 116a to a coupling between the first phase shifter 114a and one or more of the first LNA 120a, the second LNA 120b, the third LNA 120c, or the fourth LNA 120d. Additionally, the second phase shifter 114b is togglable to change the coupling between the second phase shifter 114b and the second PA 116b to a coupling between the second phase shifter 114b and one or more of the first LNA 120a, the second LNA 120b, the third LNA 120c, or the fourth LNA 120d.

In the illustrated example of FIG. 1, the coupling between the first phase shifter 114a and one or more of the first LNA 120a, the second LNA 120b, the third LNA 120c, or the fourth LNA 120d is facilitated by an example first internal loopback path 115a and an example second internal loopback path 115b corresponding the first phase shifter 114a and the second phase shifter 114b, respectively. Additionally, the coupling between the second phase shifter 114b and one or more of the first LNA 120a, the second LNA 120b, the third LNA 120c, or the fourth LNA 120d is also facilitated by the first internal loopback path 115a and the second internal loopback path 115b.

In the illustrated example of FIG. 1, each of the first PA 116a and the second PA 116b is an electronic amplifier that converts a low-power radio frequency signal from first phase shifter 114a and the second phase shifter 114b, respectively, to a higher power signal to be transmitted. In the illustrated example, each of the first PA 116a and the second PA 116b is an electronic amplifier that includes the functionality to be enabled and/or disabled by the RADAR controller 108. Furthermore, each of the first PA 116a and the second PA 116b includes a programmable gain that is adjustable by the RADAR controller 108. Additionally, each of the first PA 116a and the second PA 116b includes the functionality to introduce binary phase modulation to the signal received from the first phase shifter 114a and the second phase shifter 114b, respectively. In this manner, each of the first PA 116a is configurable to be enabled and/or disabled to introduce binary phase modulation to a signal and the second PA 116b is configurable to be enabled and/or disabled to introduce binary phase modulation to a signal, depending on the application. For example, each of the first PA 116a and the second PA 116b multiply the signal received from each of the first phase shifter 114a and the second phase shifter 114b, respectively, by a signal oscillating between negative one and positive one at a predetermined frequency (e.g., 1 MHz). In other examples, each the first PA 116a and the second PA 116b may be a class A, class AB, class B, class C, class F, or a class E amplifier depending on the application. When the first PA 116*a* and the second PA 116*b* are enabled for binary phase modulation, the signals transmitted by each of the first PA 116*a* and the second PA 116*b* are frequency modulated to add 1 MHz to the frequency of the signal generated by the LO 110.

In the illustrated example of FIG. 1, each of the first LNA 120*a*, the second LNA 120*b*, the third LNA 120*c*, and the fourth LNA 120*d* is an electronic amplifier that amplifies a signal received from the transmission network 104 without adding additional noise to the signal. In the illustrated example, each of the first LNA 120*a*, the second LNA 120*b*, the third LNA 120*c*, and the fourth LNA 120*d* includes the functionality to be enabled and/or disabled by the RADAR controller 108. Additionally, in the illustrated example, each of the first LNA 120*a*, the second LNA 120*b*, the third LNA 120*c*, and the fourth LNA 120*d* includes a peak detector that detects peak frequencies in signals that flow through each of the first LNA 120*a*, the second LNA 120*b*, the third LNA 120*c*, and the fourth LNA 120*d*. Each of the peak detectors in each of the first LNA 120*a*, the second LNA 120*b*, the third LNA 120*c*, and the fourth LNA 120*d* is sampled by the RADAR controller 108. In other examples, each of the first LNA 120*a*, the second LNA 120*b*, the third LNA 120*c*, and the fourth LNA 120*d* may be a class A, class AB, class B, class C, class F, or class E amplifier depending on the application.

In the illustrated example of FIG. 1, each of the first signal mixer 122*a*, the second signal mixer 122*b*, the third signal mixer 122*c*, and the fourth signal mixer 122*d* is an electrical circuit that mixes signals received from the first LNA 120*a*, the second LNA 120*b*, the third LNA 120*c*, and the fourth LNA 120*d*, respectively, with the signal generated by the LO 110. For example, each of the first signal mixer 122*a*, the second signal mixer 122*b*, the third signal mixer 122*c*, and the fourth signal mixer 122*d* subtracts the frequency of the signal generated by the LO 110 from the frequency of signals received from the first LNA 120*a*, the second LNA 120*b*, the third LNA 120*c*, and the fourth LNA 120*d*, respectively. In other examples, each of the first signal mixer 122*a*, the second signal mixer 122*b*, the third signal mixer 122*c*, and the fourth signal mixer 122*d* adds the frequency of the signal generated by the LO 110 to the frequency of signals received from the first LNA 120*a*, the second LNA 120*b*, the third LNA 120*c*, and the fourth LNA 120*d*, respectively. In further examples, each of the first signal mixer 122*a*, the second signal mixer 122*b*, the third signal mixer 122*c*, and the fourth signal mixer 122*d* multiplies the frequency of the signal generated by the LO 110 with the frequency of signals received from the first LNA 120*a*, the second LNA 120*b*, the third LNA 120*c*, and the fourth LNA 120*d*, respectively. Regardless of the method of mixing the signals, the output of each of the first signal mixer 122*a*, the second signal mixer 122*b*, the third signal mixer 122*c*, and the fourth signal mixer 122*d* is a signal at an intermediate frequency (IF) that is specific to the application.

In the illustrated example of FIG. 1, each of the first filter 124*a*, the second filter 124*b*, the third filter 124*c*, and the fourth filter 124*d* includes a variable gain amplifier bandpass filter. Each of the first filter 124*a*, the second filter 124*b*, the third filter 124*c*, and the fourth filter 124*d* filters unwanted frequencies from a signal so that the signal is filtered for a desired carrier frequency with a bandwidth wide enough to encompass sidebands (e.g., information transmitted by the signal). The center frequency of each of the first filter 124*a*, the second filter 124*b*, the third filter 124*c*, and the fourth filter 124*d* is tunable based on a signal (e.g., a control signal) from the RADAR controller 108. Each of the first filter 124*a*, the second filter 124*b*, the third filter 124*c*, and the fourth filter 124*d* is a demultiplexer with multiple filters coupled to the demultiplexer. In this manner, a voltage value (e.g., a binary value) generated by the RADAR controller 108 selects a combination of filters on the demultiplexer to select the center frequency of each of the first filter 124*a*, the second filter 124*b*, the third filter 124*c*, and the fourth filter 124*d*. In other examples, each of the first filter 124*a*, the second filter 124*b*, the third filter 124*c*, and the fourth filter 124*d* may be a lowpass filter, a high pass filter, a network of lowpass and high pass filters, or a combination thereof.

In the illustrated example of FIG. 1, each of the first ADC 126*a*, the second ADC 126*b*, the third ADC 126*c*, and the fourth ADC 126*d* is a device that converts an analog signal received from each of the first filter 124*a*, the second filter 124*b*, the third filter 124*c*, and the fourth filter 124*d*, respectively, and converts the analog signal to a digital signal that is transmitted to the RADAR controller 108. For example, each of the first ADC 126*a*, the second ADC 126*b*, the third ADC 126*c*, and the fourth ADC 126*d* may be a dedicated circuit.

In the illustrated example of FIG. 1, in operation, when testing a RADAR SoC in the RADAR SoC test system 100, the RADAR controller 108 executes the machine readable instructions 128. In additional or alternative examples, the RADAR controller 108 executes other machine readable instructions to control the RADAR SoC 102.

In the illustrated example of FIG. 1, the RADAR controller 108 may test a RADAR SoC to identify the ability of the RADAR SoC to measure distance, the gain and phase mismatch between transmitters of the RADAR SoC, and the gain and phase mismatch between receivers of the RADAR SoC. For example, the RADAR controller 108 is to transmit a signal (e.g., a control signal) to the LO 110 to generate a frequency modulated continuous waveform (FMCW). A FMCW is waveform that is modulated such the frequency of the waveform ramps between a first frequency and a second frequency (e.g., ramps from seventy-seven gigahertz (77 GHz) to eighty-one gigahertz (81 GHz)) over a defined period (e.g., 130 microseconds (μs)). For example, generating an FMCW allows the sensed signals to overcome intra-chip leakage in a RADAR SoC under test which can make it difficult to distinguish between sensed signals and intra-chip leakages for example when only generating a continuous waveform. Additionally or alternatively, the RADAR controller 108 is to transmit a signal to one or both of the first PA 116*a* and the second PA 116*b* to enable binary phase modulation in one or both of the first PA 116*a* and the second PA 116*b* (e.g., to generate a modulated FMCW). Additionally, in operation, the RADAR controller 108 is to transmit a signal to the first PA 116*a* to enable the output of the first PA 116*a*, a signal to the first LNA 120*a*, the second LNA 120*b*, the third LNA 120*c*, and the fourth LNA 120*d* to enable to the first LNA 120*a*, the second LNA 120*b*, the third LNA 120*c*, and the fourth LNA 120*d*. When the first PA 116*a*, the first LNA 120*a*, the second LNA 120*b*, the third LNA 120*c*, and the fourth LNA 120*d* are enabled, the FMCW is transmitted from the LO 110 through the first PA 116*a* to each of the first LNA 120*a*, the second LNA 120*b*, the third LNA 120*c*, and the fourth LNA 120*d* by way of the transmission network 104.

In the illustrated example of FIG. 1, in operation, each of the first LNA 120*a*, the second LNA 120*b*, the third LNA 120*c*, and the fourth LNA 120*d* obtains a received FMCW signal and amplifies the received FMCW signal. In operation, each of the first signal mixer 122*a*, the second signal mixer 122*b*, the third signal mixer 122*c*, and the fourth signal mixer 122*d* mixes the respective received FMCW signals from the first LNA 120*a*, the second LNA 120*b*, the third LNA 120*c*, and the fourth LNA 120*d* with the FMCW signal from the LO 110 to generate respective IF signals. In operation, each of the first filter 124*a*, the second filter 124*b*, the third filter 124*c*, and the fourth filter 124*d* filters the respective IF signals generated by the first signal mixer 122*a*, the second signal mixer 122*b*, the third signal mixer 122*c*, and the fourth signal mixer 122*d* for a desired frequency determined by a respective signal from the RADAR controller 108. In operation, each of the first ADC 126*a*, the second ADC 126*b*, the third ADC 126*c*, and the fourth ADC 126*d* converts the respective filtered IF signals from analog to digital signals and transmits the converted filtered IF signals to the RADAR controller 108.

In the illustrated example, in operation, the RADAR controller 108, in response to receiving (e.g., obtaining) the converted filtered IF signals, processes the converted filtered IF signals and generates performance characteristics of the RADAR SoC 102. The performance characteristics are based on the received FMCW. For example, the performance characteristics are generated from the converted filtered IF signal and the converted filtered IF signal is generated based on the received FMCW. After generating the performance characteristics corresponding to the first PA 116*a* (e.g., the first transmitter 112*a*), the RADAR controller 108 determines whether the quality of the performance characteristics for the current transmitter under test meets a threshold value. If the RADAR controller 108 determines that the quality of the performance characteristics does meet a threshold value, the RADAR controller 108 determines whether all the transmitters have been tested. However, if the RADAR controller 108 determines that the performance characteristics do not meet the threshold value, the RADAR controller 108 generates a signal indicating that the RADAR SoC is to be removed from production and transmits the signal to the remote device 106. In response to the signal from the RADAR controller 108, the remote device 106 removes the RADAR SoC from the production line, or thereby causes the RADAR SoC to be removed from the production line.

If all of the transmitters (e.g., the first transmitter 112*a* and the second transmitter 112*b*) have not been tested, the RADAR controller 108 disables the current transmitter under test and enables the next transmitter to be tested. For example, the RADAR controller 108 disables the first PA 116*a* and enables the second PA 116*b* by transmitting a signal to the first PA 116*a* and the second PA 116*b* and generates performance characteristics for the next transmitter. If all the transmitters have been tested, the RADAR controller 108 generates a signal indicating that the RADAR SoC can continue in production to be shipped and/or stored and transmits the signal to the remote device 106. In response to the signal from the RADAR controller 108, the remote device 106 forwards the RADAR SoC to be shipped and/or stored, or thereby causes the RADAR SoC to be shipped and/or stored.

In the illustrated example of FIG. 1, the RADAR controller 108 may test a RADAR SoC to identify a compression point of an amplifier in the RADAR SoC. For example, the RADAR controller 108 programs the LO 110 to generate a continuous waveform (CW) at a desired frequency (e.g., a frequency of seventy-seven gigahertz (77 GHz)). In operation, the RADAR controller 108 enables the first transmitter 112*a* and the first receiver 118*a* by sending a signal to enable the first PA 116*a* and the first LNA 120*a*. In operation, the RADAR controller 108 sets the first transmitter 112*a* to modulate the CW by a predetermined frequency (e.g., 10 kHz) to generate a modulated CW. The RADAR controller 108 sets the first transmitter 112*a* to modulate the CW by setting the first phase shifter 114*a* to vary the phase (e.g., the phase angle) of the CW at a constant rate (e.g., 360°/100 μs). Alternatively, the RADAR controller 108 sets the first transmitter 112*a* to modulate the CW by setting the first PA 116*a* to enable binary phase modulation.

In the illustrated example of FIG. 1, in operation, the RADAR controller 108 sets the first transmitter 112*a* to sweep the gain of the first transmitter 112*a* by varying a gain control variable in the first PA 116*a* such that the gain of the first PA 116*a* transitions from a first value (e.g., 12 dBm) to a second value (e.g., −18 dBm). In operation, the RADAR controller 108 measures the power of the CW received at the first LNA 120*a* (e.g., a first received CW) with respect to the gain control variable of the first PA 116*a*. After receiving the output of the first ADC 126*a*, the RADAR controller 108 calculates an FFT of the signal output from the first ADC 126*a* and the power of the peak frequency of the FFT with respect to the gain control variable. In operation, the RADAR controller 108 determines whether all the receivers (e.g., the first receiver 118*a*, the second receiver 118*b*, the third receiver 118*c*, the fourth receiver 118*d*) have been tested.

In the illustrated example of FIG. 1, in operation, the RADAR controller 108 repeats the test for each receiver and when all the receivers have been tested, the RADAR controller 108 combines the LNA data and the ADC data for each receiver tested. The RADAR controller 108 then identifies the ADC power that corresponds to the compression point of each receiver. For example, the compression point corresponds to the point at which the gain of the receiver decreases one (1) decibel (dB) from its maximum value (e.g., the P1 dB point). In the example of FIG. 1, the compression point at which the gain the receiver decreases one (1) dB from its maximum value corresponds to power of the first LNA 120*a* when the power of the first ADC 126*a* is 1 dB below the highest value measured for the power of the first ADC 126*a*. If the value of the compression point (e.g., the P1 dB point) meets a threshold value, the RADAR controller 108 generates a signal indicating that the RADAR SoC can continue in production to be shipped and/or stored and transmits the signal to the remote device 106. However, if the RADAR controller 108 determines that the compression point (e.g., the P1 dB point) does not meet the threshold value, the RADAR controller 108 generates a signal indicating that the RADAR SoC is to be removed from production and transmits the signal to the remote device 106. In response to the signal from the RADAR controller 108, the remote device 106 removes the RADAR SoC from the production line, forwards the RADAR SoC to be shipped and/or stored, thereby causes the RADAR SoC to be removed from the production line, or thereby causes the RADAR SoC to be shipped and/or stored, based on the signal from the RADAR controller 108.

In the illustrated example of FIG. 1, the RADAR controller 108 may test a RADAR SoC to identify a compression point of an amplifier in the RADAR SoC via an alternative test. For example, the RADAR controller 108 programs the LO 110 to generate a CW at a desired frequency (e.g., 77 GHz). In operation, the RADAR controller 108 enables the first transmitter 112*a* and the first receiver 118*a* by sending a signal the first PA 116*a* and the first LNA 120*a* to enable the first PA 116*a* and the first LNA 120*a*. In operation, the RADAR controller 108 sets the second transmitter 112*b* to modulate the CW by a predetermined frequency (e.g., 4 MHz). The RADAR controller 108 sets the second transmitter 112*b* to modulate the CW by setting the second phase shifter 114*b* to vary the phase of the CW at a constant rate. The RADAR controller 108 disables the second PA 116*b* by transmitting a signal to disable the second PA 116*b*. The RADAR controller 108 enables an internal loopback path between the second phase shifter 114*b* and the first LNA 120*a* by transmitting a signal to the second phase shifter 114*b* to toggle the connection between the transmission network 104 and the internal loopback path.

In the illustrated example of FIG. 1, in operation, the RADAR controller 108 sets the first transmitter 112*a* to sweep the gain of the first transmitter 112*a* by varying a gain control variable in the first PA 116*a* such that the gain of the first PA 116*a* transitions from a first value (e.g., 12 dBm) to a second value (e.g., −18 dBm). In operation, the RADAR controller 108 measures the power of the CW received at the first LNA 120*a* with respect to the gain control variable of the first PA 116*a*. For example, the signal received at the first LNA 120*a* is a combined CW including the signal generated by the first transmitter 112*a* and the signal generated by the second transmitter 112*b*. In such an example, the first LNA 120*a* receives the signal generated by the first transmitter 112*a* as a first received CW and the first LNA 120*a* receives the signal generated by the second transmitter 112*b* as a second received CW, combining the first received CW and the second received CW to generate the combined CW. After receiving the output of the first ADC 126*a*, the RADAR controller 108 calculates an FFT of the signal that is output from the first ADC 126*a* and the power of the peak frequency of the FFT with respect to the gain control variable. In operation, the RADAR controller 108 determines whether all the receivers (e.g., the first receiver 118*a*, the second receiver 118*b*, the third receiver 118*c*, the fourth receiver 118*d*) have been tested. The RADAR controller 108 repeats the test for each receiver and when all the receivers have been tested, the RADAR controller 108 combines the LNA data and the ADC data for each receiver tested. The RADAR controller 108 then identifies the P1 dB point. If the value of the P1 dB point meets a threshold value, the RADAR controller 108 generates a signal indicating that the RADAR SoC can continue in production to be shipped and/stored and transmits the signal to the remote device 106. However, if the RADAR controller 108 determines that the P1 dB point does not meet the threshold value, the RADAR controller 108 generates a signal indicating that the RADAR SoC is to be removed from production and transmits the signal to the remote device 106. In response to the signal from the RADAR controller 108, the remote device 106 removes the RADAR SoC from the production line, forwards the RADAR SoC to be shipped and/or stored, thereby causes the RADAR SoC to be removed from the production line, or thereby causes the RADAR SoC to be shipped and/or stored, based on the signal from the RADAR controller 108.

Figure 2:
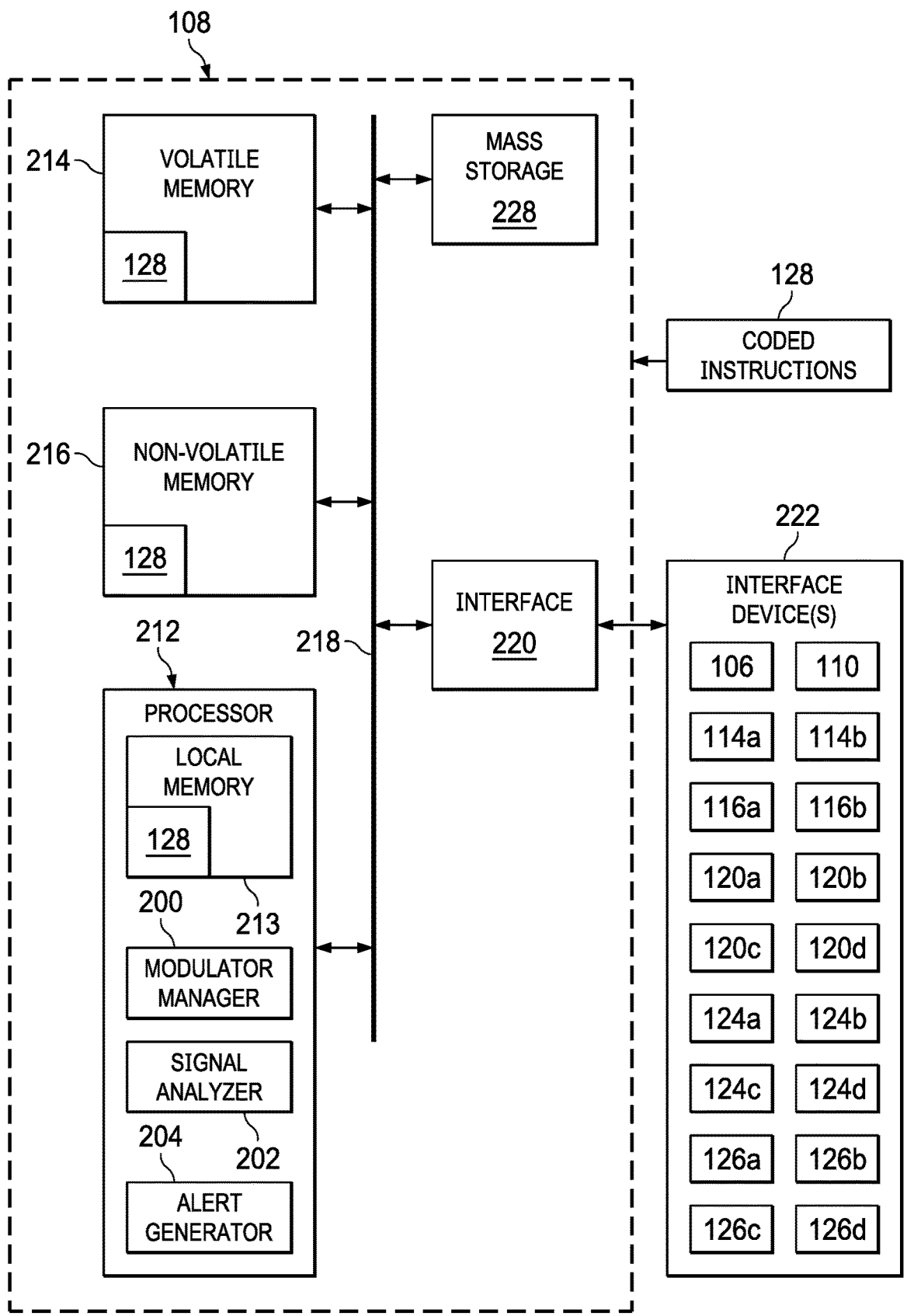
FIG. 2 is a block diagram showing further detail of an example RADAR controller of FIG. 1.

FIG. 2 is a block diagram of a RADAR controller 108 structured to execute the instructions of FIGS. 9, 10, 11, and 12 to implement an example modulator manager 200, an example signal analyzer 202, and an example alert generator 204. The RADAR controller 108 includes one or more integrated circuits. In other examples, the RADAR controller 108 includes, for example, one or more logic circuits, microprocessors, graphics processing units (GPUs), digital signal processors (DSPs), controllers from any desired family or manufacturer, or any other type of computing device. The RADAR controller 108 may be a semiconductor based (e.g., silicon based) device. In some examples, the RADAR controller 108 may be implemented on a single die, multiple die, or a separate die from the other components of the RADAR SoC 102.

The RADAR controller 108 of the illustrated example includes a RADAR processor 212. The RADAR processor 212 of the illustrated example is a DSP. The example RADAR processor 212 is hardware. In other examples, the RADAR processor 212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example modulator manager 200, the example signal analyzer 202, and the example alert generator 204.

The RADAR processor 212 of the illustrated example includes a local memory 213 (e.g., a cache). The RADAR processor 212 of the illustrated example is in communication with a main memory including a volatile memory 214 and a non-volatile memory 216 via a bus 218. The volatile memory 214 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 216 may be implemented by flash memory and/or any other desired type of memory device. Access to the main memory 214, 216 is controlled by a memory controller.

The RADAR controller 108 of the illustrated example also includes an interface circuit 220. The interface circuit 220 may be implemented by a serial flash interface, a power management integrated circuit (PMIC) interface, a controller area network (CAN) interface, CAN with a flexible data-rate (CAN-FD) interface, a universal asynchronous receiver-transmitter (UART) interface, a low-voltage differential signaling (LVDS) interface, a hardware-in-the-loop (HIL) interface.

In the illustrated example, one or more interface devices 222 are connected to the interface circuit 220. The interface device(s) 222 allow for the entry of data and/or commands into the RADAR processor 212. The interface device(s) 222 can be implemented by, for example, a desktop computer, a laptop computer, the remote device 106, the LO 110, the first phase shifter 114*a*, the second phase shifter 114*b*, the first PA 116*a*, the second PA 116*b*, the first LNA 120*a*, the second LNA 120*b*, the third LNA 120*c*, the fourth LNA 120*d*, the first filter 124*a*, the second filter 124*b*, the third filter 124*c*, the fourth filter 124*d*, the first ADC 126*a*, the second ADC 126*b*, the third ADC 126*c*, the fourth ADC 126*d*.

The interface circuit 220 of the illustrated example also includes a communication device such as a serial flash interface circuit, a PMIC interface circuit, a CAN interface circuit, a CAN-FD interface circuit, a UART circuit, a LVDS interface circuit, a HIL interface circuit.

The RADAR controller 108 of the illustrated example also includes one or more mass storage devices 228 for storing software and/or data. Examples of such mass storage devices 228 include a non-transitory computer readable storage device or storage disk such as non-volatile memory (e.g., ROM, electrically erasable programmable ROM (EEPROM), flash memory, etc.), and/or any other type of ROM device), etc., including the software and/or firmware.

The machine readable instructions 128 of FIG. 1 may be stored in the mass storage device 228, in the volatile memory 214, in the non-volatile memory 216, and/or on a removable non-transitory computer readable storage medium such as a CD or DVD. For example, the machine readable instructions 900 of FIG. 9, sub-routine of block 908 of FIG. 10, the machine readable instructions 1100 of FIG. 11, the machine readable instructions 1200 of FIG. 12 may be implemented by the machine readable instructions 128 of FIG. 1.

In the illustrated example of FIG. 2, the example modulator manager 200 controls the transmitter and receivers that generate and/or receive signals in a RADAR SoC (e.g., the RADAR SoC 102). For example, the modulator manager 200 programs the LO 110 to generate FMCW signals and CW signals. Additionally, the example modulator manager 200 programs one or both of the first phase shifter 114a and the second phase shifter 114b to enable and/or disable one or both of the first phase shifter 114a and the second phase shifter 114b. Additionally, the example modulator manager 200 programs the first phase shifter 114a and the second phase shifter 114b to adjust the phase of the signal generated by the LO 110. Furthermore, the example modulator manager 200 programs the first phase shifter 114a and the second phase shifter 114b to toggle the first phase shifter 114a and the second phase shifter 114b to couple the first phase shifter 114a and the second phase shifter 114b to one of the first LNA 120a, the second LNA 120b, the third LNA 120c, or the fourth LNA 120d.

In the illustrated example of FIG. 2, the example modulator manager 200 programs one or both of the first PA 116a and the second PA 116b to enable and/or disable one or both of the first PA 116a and the second PA 116b. Additionally, the example modulator manager 200 programs one or both of the first PA 116a and the second PA 116b to enable and/or disable binary phase modulation in one or both of the first PA 116a and the second PA 116b. Furthermore, the example modulator manager 200 programs a first gain control variable and a second gain control variable (e.g., a TX_Backoff_1 variable, a TX_Backoff_2 variable, etc.) of the first PA 116a and the second PA 116b to control the gain of the first PA 116a and the second PA 116b respectively. For example, the modulator manager 200 controls the gain of the first PA 116a such that the output power of the first PA 116a is equal to the peak output power minus the first gain control variable (e.g., TX_Output_Power_1=12 dBm−TX_Backoff_1). Additionally, the modulator manager 200 controls the gain of the second PA 116b such that the output power of the second PA 116b is equal to the peak output power minus the second gain control variable (e.g., TX_Output_Power 2=12 dBm−TX_Backoff_2).

In the illustrated example of FIG. 2, the modulator manager 200 programs one or more of the first filter 124a, the second filter 124b, the third filter 124c, or the fourth filter 124d to select a frequency to receive at each of the first receiver 118a, the second receiver 118b, the third receiver 118c, or the fourth receiver 118d, respectively. The modulator manager 200 transmits signals corresponding to each of the signals generated to control each of the LO 110, the first phase shifter 114a, the second phase shifter 114b, the first PA 116a, the second PA 116b, the first filter 124a, the second filter 124b, the third filter 124c, and the fourth filter 124d to the example signal analyzer 202.

In the illustrated example of FIG. 2, the example signal analyzer 202 processes and analyzes signals received by a receiver of a RADAR SoC (e.g., the RADAR SoC 102). Additionally, the example signal analyzer 202 receives signals (e.g., control signals) from the example modulator manager 200 corresponding to signals generated by a local oscillator and/or modulated by a transmitter.

In the illustrated example of FIG. 2, the example signal analyzer 202 generates performance characteristics based on the received signals from the first LNA 120a, the second LNA 120b, the third LNA 120c, the fourth LNA 120d, the first ADC 126a, the second ADC 126b, the third ADC 126c, and the fourth ADC 126d. For example, the performance characteristics are based on FMCW signals and/or CW signals. For example, the example signal analyzer 202 generates a fast Fourier transform (FFT) of each of the signals received from the first ADC 126a, the second ADC 126b, the third ADC 126c, and the fourth ADC 126d. The example signal analyzer 202 identifies a peak frequency in the FFT of each of the first ADC 126a, the second ADC 126b, the third ADC 126c, and fourth ADC 126d. The example signal analyzer 202 determines whether the frequency of the peak frequency meets (e.g., is within) a threshold value (e.g., a threshold frequency) of a predetermined frequency of the peak frequency (e.g., a predetermined value). For example, the predetermined peak frequency corresponds to a length of a transmission path associated with the transmission network 104 and the control signal to generate the FMCW or CW with the LO 110. The predetermined peak frequency corresponding to a FMCW is calculated by the example signal analyzer 202 based on equation 1:

$$f = \frac{FMCW_{slope} * L_{TP}}{c} \qquad \text{Equation-1}$$

In the illustrated example of FIG. 2, the $FMCW_{slope}$ variable corresponds to the slope of a FMCW signal and equals 30 MHz/μs. The $L_{TP}$ variable corresponds to the length of the transmission path and equals ten centimeters (cm). The c variable corresponds to the speed of light and equals $3*10^8$ m/s. The predetermined peak frequency f equals 10 kHz. The threshold value is 4 kHz above and/or below the predetermined peak frequency. The example threshold value corresponds to an acceptable performance range of performance of a RADAR SoC to detect objects at a distance. For example, the predetermined peak frequency corresponds to the intermediate IF.

In the illustrated example of FIG. 2, the example signal analyzer 202 calculates gain and phase for each transmitter and receiver pair tested. The example signal analyzer 202 uses the gain and phase measurements for each transmitter and receiver pair tested to compute the gain and phase mismatch for each transmitter (e.g., the first transmitter 112a, the second transmitter 112b, etc.) and each receiver (e.g., the first receiver 118a, the second receiver 118b, the third receiver 118c, the fourth receiver 118d, etc.) in a RADAR SoC. For example, the signal analyzer 202 sets a first pair of transmitter and receiver (e.g., the first transmitter 112a and the first receiver 118a) as a reference pair. The example signal analyzer 202 determines the amplitude (e.g., the gain) of the peak frequency of each of the transmitter and receiver pairs and the phase at the peak frequency of each of the transmitter and receiver pairs. For example, the gain and phase mismatch are determined based on equations 2 and 3:

Gain $MM(TXm,RXn)$=Peak_$dBm(TXm,RXn)$−
  Peak_$dBm(TX1,RX1)$ \qquad Equation-2

Phase $MM(TXm,RXn)$=Peak_Phase$(TXm,RXn)$−Peak_
  Phase$(TX1,RX1)$ \qquad Equation-3

In the illustrated example of FIG. 2, the Gain MM (TXm, RXn) variable corresponds to the gain mismatch of a transmitter m and a receiver n pair. The Peak_dBm(TXm, RXn) variable corresponds to the gain of the peak frequency of the transmitter m and the receiver n pair. The Peak_dBm(TX1, RX1) variable corresponds to the gain of the peak frequency of the reference transmitter and the receiver pair (e.g., the first transmitter 112*a* and the first receiver 118*a*). The Phase MM (TXm,RXn) variable corresponds to the phase mismatch of a transmitter m and a receiver n pair. The Peak_Phase (TXm, RXn) variable corresponds to the phase of the peak frequency of the transmitter m and the receiver n pair. The Peak_Phase (TX1,RX1) variable corresponds to the phase of the peak frequency of the reference transmitter and the receiver pair (e.g., the first transmitter 112*a* and the first receiver 118*a*). The signal analyzer 202 determines whether the gain and phase mismatch meets (e.g., are within) a threshold value of acceptable mismatch. For example, gain and phase mismatch that does not meet the threshold value corresponds to a lesser ability of a RADAR SoC to determine direction of an object and is undesirable.

In the illustrated example of FIG. 2, the example signal analyzer 202 calculates a signal to noise ratio (SNR) at each receiver (e.g., the first receiver 118*a*, the second receiver 118*b*, the third receiver 118*c*, the fourth receiver 118*d*, etc.). For example, the signal analyzer 202 calculates the power of the pass band of the desired frequency (e.g., the center frequency of each of the first filter 124*a*, the second filter 124*b*, the third filter 124*c*, the fourth filter 124*d*) and the average power of the pass band of all other bandwidths that do not correspond to the desired frequency. For example, the SNR of each receiver is calculated based on equations 4, 5, and 6:

$$\text{Power}_{RXm} = P_{f_{peak} bandpass} \qquad \text{Equation--5}$$

$$\text{Power}_{RXm\,Noise} = avg\big(P_{total\,bandpass} - P_{f_{peak} bandpass}\big) \qquad \text{Equation--6}$$

$$SNR_{RXm} = 10 * \log_{10}\left(\frac{\text{Power}_{RXm}}{\text{Power}_{RXm\,Noise}}\right) \qquad \text{Equation--7}$$

In the illustrated example of FIG. 2, the $\text{Power}_{RXm}$ variable corresponds to power of the pass band of the desired frequency at a receiver m. The $P_{f_{peak} bandpass}$ variable corresponds to the power at the peak frequency of the receiver m. The $\text{Power}_{RXm\,Noise}$ variable corresponds to the power of the noise at a receiver m. The $avg(P_{total\,bandpass} - P_{f_{peak} bandpass})$ variable corresponds to the average power of the pass band of all other bandwidths that do not correspond to the desired frequency of a receiver m. The $SNR_{RXm}$ variable corresponds to the signal to noise ratio at receiver m. The Peak_Phase (TX1,RX1) variable corresponds to the phase of the peak frequency of the reference transmitter and the receiver pair (e.g., the first transmitter 112*a* and the first receiver 118*a*). The signal analyzer 202 determines whether the SNR at each receiver meets (e.g., is above) a threshold value. For example, SNR above the threshold value corresponds to ability of a RADAR SoC to clearly detect objects across various distances.

In the illustrated example of FIG. 2, if the example signal analyzer 202 determines that any of the peak frequencies measured at each of the receivers does not meet (e.g., is outside) a threshold value of the predetermined peak frequencies on the receivers, the gain and phase mismatch for any of the receivers does not meet (e.g., is outside of) the threshold value of acceptable mismatch, or the SNR at each receiver does not meet (e.g., is below) the threshold value, the example signal analyzer 202 indicates that the RADAR SoC under test has undesirable performance characteristics. However, if the example signal analyzer 202 determines that all of the peak frequencies measured at the receivers meets (e.g., is within) a threshold value of the predetermined peak frequency, the gain and phase mismatch for all of the receivers meet (e.g., are within) the threshold value of acceptable mismatch, or the SNR at each receiver meets (e.g., is above) the threshold value, the example signal analyzer 202 indicates that the RADAR SoC under test has desirable performance characteristics.

In the illustrated example of FIG. 2, the example signal analyzer 202 measures the power at (e.g., at the input of) each of the first LNA 120*a*, the second LNA 120*b*, the third LNA 120*c*, and the fourth LNA 120*d* and stores the power at each of the first LNA 120*a*, the second LNA 120*b*, the third LNA 120*c*, and the fourth LNA 120*d* with respect to a varied gain on one or both of the first PA 116*a* and the second PA 116*b*. The example signal analyzer 202 additionally stores the power at the peak frequency determined in the FFT at each receiver (e.g., the first receiver 118*a*, the second receiver 118*b*, the third receiver 118*c*, the fourth receiver 118*d*) with respect to a varied gain on one or both of the first PA 116*a* and the second PA 116*b*.

In the example of FIG. 2, the signal analyzer 202 combines the power at each of the first LNA 120*a*, the second LNA 120*b*, the third LNA 120*c*, and the fourth LNA 120*d* with respect to a varied gain on one or both of the first PA 116*a* and the second PA 116*b* with the power at the peak frequency determined in the FFT at each receiver with respect to a varied gain on one or both of the first PA 116*a* and the second PA 116*b* to generate a set of data corresponding to the power at the peak frequency determined in the FFT at each receiver with respect to a varied gain on one or both of the first PA 116*a* and the second PA 116*b* with respect to the power at each of the first LNA 120*a*, the second LNA 120*b*, the third LNA 120*c*, and the fourth LNA 120*d*.

In the example of FIG. 2, after determining the data set corresponding to the power at the peak frequency determined in the FFT at each receiver with respect to a varied gain on one or both of the first PA 116*a* and the second PA 116*b* with respect to the power at each of the first LNA 120*a*, the second LNA 120*b*, the third LNA 120*c*, and the fourth LNA 120*d* the example signal analyzer 202 identifies a compression point (e.g., the P1 dB point) for each receiver. The example signal analyzer 202 determines whether the P1 dB point of each receiver meets a threshold value. If the compression point (e.g., P1 dB point) of any of the receivers does not meet the threshold value, the example signal analyzer 202 indicates that the RADAR SoC under test has undesirable performance characteristics. However, if the compression point (e.g., the P1 dB point) of all of the receivers meet the threshold value, the example signal analyzer 202 indicates that the RADAR SoC under test has desirable performance characteristics.

In the illustrated example of FIG. 2, the example alert generator 204 generates a status signal based on the quality of performance characteristics. Additionally, the example alert generator 204 transmits the status signal to the remote device 106 to cause the remote device 106 to remove a RADAR SoC under test from a production line, forward the RADAR SoC under test to be shipped and/or stored, thereby cause the RADAR SoC under test to be removed from a production line, or thereby cause the RADAR SoC under test to be shipped and/or stored.

FIG. 3 is a block diagram showing further detail of a transmission network 104 of FIG. 1. Example system and method for testing transceiver similar to the above methods, apparatus, and system are disclosed in U.S. patent application Ser. No. 15/005,638, which is hereby incorporated by reference in its entirety.

FIG. 3 illustrates an example loopback testing mode of the transmission network 104. The transmission network 104 includes an input coupler 300, a power divider 302, a power combiner 304, an output coupler 306 and a loopback line 308.

In the loopback testing mode, input coupler 300 of transmission network 104 is used to couple an output signal from one or more transmitters (e.g., the first transmitter 112a, the second transmitter 112b, etc.) to one or more receivers (e.g., the first receiver 118a, the second receiver 118b, the third receiver 118c, the fourth receiver 118d, etc.).

In the illustrated example, the RADAR controller 108 sends a control signal to each of the first transmitter 112a and the second transmitter 112b to serially enable each of the first transmitter 112a and the second transmitter 112b. The output of each of the first transmitter 112a and the second transmitter 112b is provided to power combiner 304. Power combiner 304 then sends out a combined output signal 310 to output coupler 306.

In a loopback testing mode, output coupler 306 coupled combined output signal 310 to loopback line 308 as a coupled output signal 312. Output coupler 306 has a known transfer function, wherein coupled output signal 312 will have a predetermined functional relationship to combined output signal 310 with respect to predetermined parameters, non-limiting examples of which include amplitude, phase, frequency and combinations thereof.

Coupled output signal 312 is provided to input coupler 300 via loopback line 308. Input coupler 300 then provides coupled output signal 312 to power divider 302 as signal 314. Input coupler 300 has a known transfer function, wherein signal 314 will have a predetermined functional relationship to coupled output signal 312 with respect to predetermined parameters, non-limiting examples of which include amplitude, phase, frequency and combinations thereof. Power divider 302 splits signal 314 to all receivers (e.g., the first receiver 118a, the second receiver 118b, the third receiver 118c, the fourth receiver 118d).

During the test sequence, the transfer function of each of power combiner 304, output coupler 306, input coupler 300 and power divider 302 are known. In some embodiments, these transfer functions can be determined as part of a test hardware calibration procedure. Further, the transfer function of each of the first transmitter 112a, the second transmitter 112b, the first receiver 118a, the second receiver 118b, the third receiver 118c, and the fourth receiver 118d are anticipated.

In the illustrated example, the RADAR controller 108 sends a control signal to one or more of the first transmitter 112a or the second transmitter 112b, to serially enable each of the first transmitter 112a, or the second transmitter 112b. The control signal not only enables the first transmitter 112a or the second transmitter 112b, but the control signal additionally instructs the one or more of the first transmitter 112a or the second transmitter 112b as to what signal to transmit. In particular, the control signal provides information related to parameters of the signal to be transmitter, non-limiting examples of such parameters include amplitude, frequency, phase, duration, etc.

For purposes of brevity, consider the case where the first transmitter 112a is tested, along with all the receivers (e.g., the first receiver 118a, the second receiver 118b, the third receiver 118c, the fourth receiver 118d). In such a case, the transfer function of the first transmitter 112a, the first receiver 118a, the second receiver 118b, the third receiver 118c, and the fourth receiver 118d are anticipated. As mentioned previously, each of the first transmitter 112a and the second transmitter 112b have a known and expected transfer function, if it is operating correctly.

As such, a signal provided to power combiner 304 from the first transmitter 112a should have an expected functional relationship to the signal that the first transmitter 112a transmits, based on a control signal and the known transfer function of the first transmitter 112a. Similarly, combined output signal 310 should have a known functional relationship to the signal provided to the power combiner 304, based on the known transfer function of power combiner 304.

Combined output signal 310 should have a known functional relationship to coupled output signal 312, based on the known transfer function of output coupler 306. Further, signal 314 should have a known functional relationship to coupled output signal 312, based on the known transfer function of input coupler 300. Still further, the signal received each of the first receiver 118a, the second receiver 118b, the third receiver 118c, and the fourth receiver 118d should have a known functional relationship to signal 314 based on the known transfer function of power divider 302.

The expected output signal from each of the first receiver 118a, the second receiver 118b, the third receiver 118c, and the fourth receiver 118d that corresponds to the control signal sent to the first transmitter 112a is based on the known transfer function of each of power combiner 304, output coupler 306, input coupler 300 and power divider 302 and the anticipated transfer function of each of the first transmitter 112a and the first receiver 118a, the second receiver 118b, the third receiver 118c, and the fourth receiver 118d. In an example embodiment, these expected output signals from the first receiver 118a, the second receiver 118b, the third receiver 118c, and the fourth receiver 118d are stored in the RADAR controller 108.

In this manner, the actual output signal from each of the first receiver 118a, the second receiver 118b, the third receiver 118c, and the fourth receiver 118d is provided to the RADAR controller 108. In some embodiments, the actual output signal from each of the first receiver 118a, the second receiver 118b, the third receiver 118c, and the fourth receiver 118d is encoded. Any known method of transmitting the output signals from each of the first receiver 118a, the second receiver 118b, the third receiver 118c, and the fourth receiver 118d may be implemented, so long as the RADAR controller 108 is able to distinguish which output signal corresponds to which of the first receiver 118a, the second receiver 118b, the third receiver 118c, and the fourth receiver 118d.

In the example of FIG. 3, RADAR controller 108 then compares the actual output signal from each of the first receiver 118a, the second receiver 118b, the third receiver 118c, and the fourth receiver 118d with the corresponding expected output signals for each of the first receiver 118a, the second receiver 118b, the third receiver 118c, and the fourth receiver 118d.

If the actual output signal for any of the first receiver 118a, the second receiver 118b, the third receiver 118c, and the fourth receiver 118d does not coincide with the expected output signal within a predetermined threshold, then the receiver(s) in question is (or are) not performing correctly. In the loopback testing method of FIG. 3, if the actual output signal for any of the first receiver 118a, the second receiver 118b, the third receiver 118c, and the fourth receiver 118d does not coincide with the expected output signal within a predetermined threshold then: a) the receiver(s) in question is (or are) not performing correctly: b) the first transmitter 112a is not performing correctly: or c) some combination of the receiver(s) in question and the first transmitter 112a is not performing correctly.

With a transmission network (e.g., the transmission network 104) in accordance with aspects of the examples disclosed herein, all the transmitters (e.g., the first transmitter 112a and the second transmitter 112b) and all the receivers (e.g., the first receiver 118a, the second receiver 118b, the third receiver 118c, and the fourth receiver 118d) can easily be tested at production.

FIG. 4 is a graphical illustration of an example fast Fourier transform (FFT) output versus frequency plot 400. The example FFT output versus frequency plot 400 is representative of FFT data used to identify the peak frequency in a signal that the signal analyzer 202 receives from one or more of the first ADC 126a, the second ADC 126b, the third ADC 126c, and the fourth ADC 126d when one or more of the first transmitter 112a and the second transmitter 112b do not modulate the signal (e.g., a FMCW signal) generated by the LO 110 via binary phase modulation. The FFT output versus frequency plot 400 includes an example amplitude axis 402, an example frequency axis 404, an example peak frequency 406, an example threshold region 408, an example pass band of the desired frequency 410, and an example pass band of all other bandwidths that do not correspond to the desired frequency 412.

In the illustrated example of FIG. 4, the amplitude axis 402 represents the amplitude (e.g., amplitude in dB) of the frequencies in the output of the FFT that is computed by the example signal analyzer 202. The frequency axis 404 represents the range of frequencies (e.g., frequencies in Hz) in the output of the FFT that is computed by the example signal analyzer 202. The amplitude axis 402 ranges from 0 dB to −120 dB and the frequency axis 404 ranges from −600 kHz to 600 kHz.

In the illustrated example of FIG. 4, the example peak frequency 406 is at a frequency of 10 kHz. For example, the peak frequency 406 as illustrated in FIG. 4 corresponds to a loopback distance (e.g., a loopback path external to the RADAR SoC under test) as computed by the example signal analyzer 202. In the example of FIG. 4, the example signal analyzer 202 compares the peak frequency (e.g., the peak frequency 406) to a predetermined peak frequency (e.g., 10 kHz). If the peak frequency (e.g., the peak frequency 406) is within a threshold value of the predetermined peak frequency (e.g., the threshold region 408), the RADAR SoC under test is capable of determining distances with an acceptable accuracy. The threshold region 408 includes frequencies that are within a threshold value of 4 kHz of the predetermined peak frequency (e.g., 10 kHz). The threshold region 408 ranges from 6 kHz to 14 kHz.

In the illustrated example of FIG. 4, the example pass band of the desired frequency 410 corresponds to the pass band used by the signal analyzer 202 to compute the signal power of the peak frequency when determining the SNR of signals received from one or more of the first ADC 126a, the second ADC 126b, the third ADC 126c, or the fourth ADC 126d. The pass band of all other bandwidths that do not correspond to the desired frequency 412 corresponds to the pass band used by the signal analyzer 202 to compute the power of the noise when determining the SNR of signals received from one or more of the first ADC 126a, the second ADC 126b, the third ADC 126c, or the fourth ADC 126d. The signal analyzer 202 uses the signal power and noise power to determine the SNR of signals received from one or more of the first ADC 126a, the second ADC 126b, the third ADC 126c, or the fourth ADC 126d.

Figure 5:
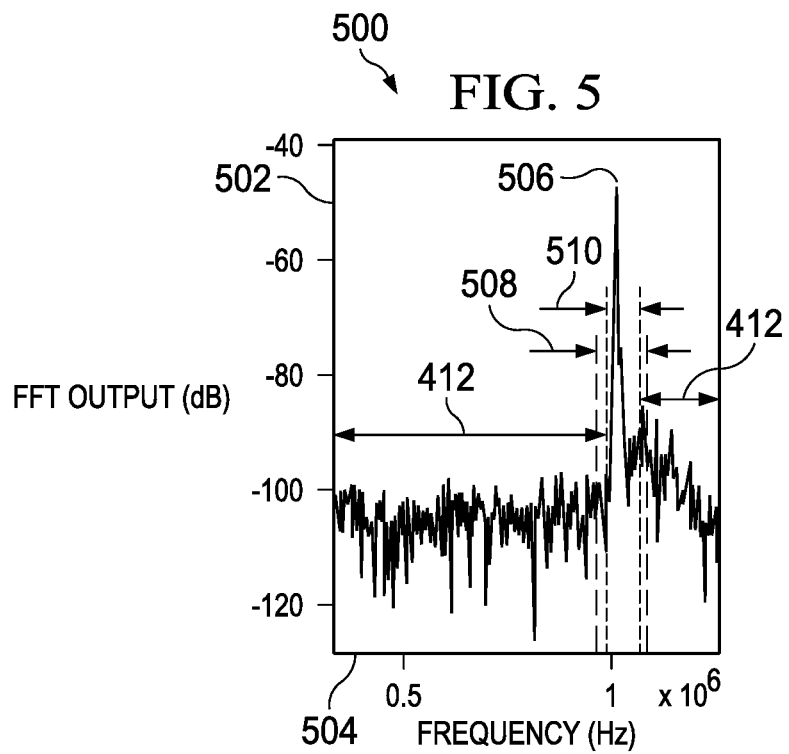
FIG. 5 is a graphical illustration of an example FFT output versus frequency plot.

FIG. 5 is a graphical illustration of an example FFT output versus frequency plot 500. The example FFT output versus frequency plot 500 is representative of FFT data used to identify the peak frequency in a signal that the signal analyzer 202 receives from one or more of the first ADC 126a, the second ADC 126b, the third ADC 126c, and the fourth ADC 126d when one or more of the first transmitter 112a and the second transmitter 112b modulate the signal (e.g., a FMCW signal) generated by the LO 110. For example, the example FFT output versus frequency plot 500 is representative of FFT data used by the signal analyzer 202 to identify peak frequency in a signal when the signal is modulated by binary phase modulation. In such an example, the signal is modulated by binary phase modulation in order to simulate measuring distances in an application environment. For example, the signal analyzer 202 can determine how the RADAR SoC will determine larger distances (e.g., 100 meters, 50 meters, etc. without the need without actually transmitting the signals across the larger distance. To simulate a larger distance, the example modulator manager 200 enables binary phase modulation in one or more of the first PA 116a or the second PA 116b. The example binary phase modulation in the first PA 116a and the second PA 116b modulates signals transmitted by the first PA 116a and the second PA 116b by 1 MHz. the FFT output versus frequency plot 500 includes an example amplitude axis 502, an example frequency axis 504, an example peak frequency 506, an example threshold region 508, an example pass band of the desired frequency 510, and an example pass band of all other bandwidths that do not correspond to the desired frequency 512.

In the illustrated example of FIG. 5, the amplitude axis 502 represents the amplitude (e.g., amplitude in dB) of the frequencies in the output of the FFT that is computed by the example signal analyzer 202. The frequency axis 504 represents the range of frequencies (e.g., frequencies in Hz) in the output of the FFT that is computed by the example signal analyzer 202. The amplitude axis 502 ranges from 0 dB to −120 dB and the frequency axis 504 ranges from 250 kHz to 1.25 MHz.

In the illustrated example of FIG. 5, the example peak frequency 506 is at a frequency of 1 MHz plus 10 kHz. For example, the peak frequency 506 as illustrated in FIG. 5 corresponds to a loopback distance as computed by the example signal analyzer 202 when simulating objects at application specific distances. In the example of FIG. 5, the example signal analyzer 202 compares the peak frequency (e.g., the peak frequency 506) to a predetermined peak frequency (e.g., 1 MHz+10 kHz). If the peak frequency (e.g., the peak frequency 506) is within a threshold value of the predetermined peak frequency (e.g., the threshold region 508), the RADAR SoC under test is capable of determining distances with an acceptable accuracy. The threshold region 508 includes frequencies that are within a threshold value of 4 kHz of the predetermined peak frequency (e.g., 1 MHz plus 10 kHz). The threshold region 508 ranges from 1 MHz plus 6 kHz to 1 MHz plus 14 kHz.

In the illustrated example of FIG. 5, the example pass band of the desired frequency 510 corresponds to the pass band used by the signal analyzer 202 to compute the signal power of the peak frequency when determining the SNR of signals received from one or more of the first ADC 126a, the second ADC 126b, the third ADC 126c, or the fourth ADC 126d. The pass band of all other bandwidths that do not correspond to the desired frequency 512 corresponds to the pass band used by the signal analyzer 202 to compute the power of the noise when determining the SNR of signals received from one or more of the first ADC 126a, the second ADC 126b, the third ADC 126c, or the fourth ADC 126d. The signal analyzer 202 uses the signal power and noise power to determine the SNR of signals received from one or more of the first ADC 126a, the second ADC 126b, the third ADC 126c, or the fourth ADC 126d.

Figure 6:
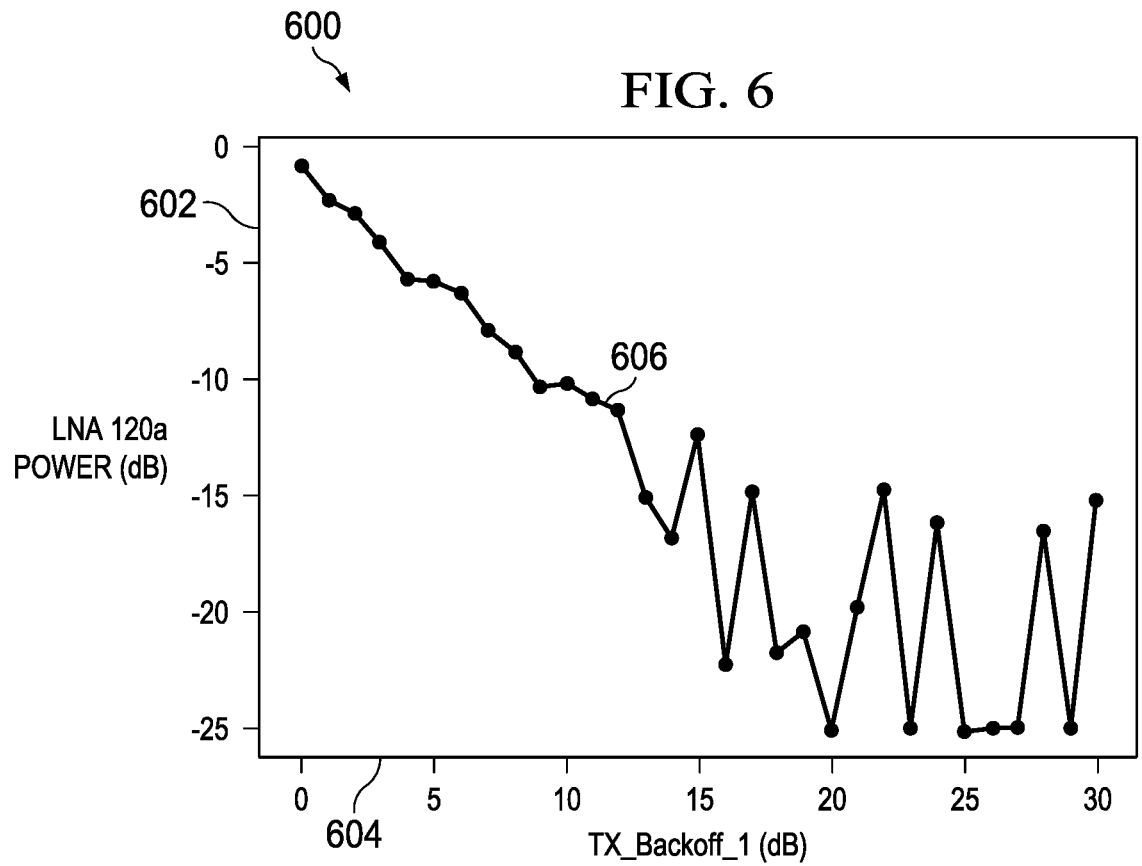
FIG. 6 is a graphical illustration of an example low noise amplifier (LNA) power output versus power amplifier (PA) gain plot.

FIG. 6 is a graphical illustration of an example low noise amplifier (LNA) power input versus power amplifier (PA) gain plot 600. The example LNA power input versus PA gain plot 600 is representative of power of the peak frequency detected by the signal analyzer 202 at the input of the first LNA 120a versus the gain of the first PA 116a as the example modulator manager 200 varies the TX_Backoff_1 variable. The TX_Backoff_1 variable corresponds to a programmable setting of the first transmitter 112a that can be programmed with a value corresponding to a value to reduce the gain of the first transmitter 112a. The LNA power input versus PA gain plot 600 includes an example LNA power axis 602, an example PA gain axis 604, and an example LNA input power curve 606. The LNA power axis 602 corresponds to the power of the signal that is output from the first LNA 120a.

In the illustrated example of FIG. 6, the LNA input power curve 606 is representative of the power of the signal received at the input of the first LNA 120a measured by the signal analyzer 202. As the modulator manager 200 adjusts the gain of the first PA 116a and modulates the signal generated by the LO 110, the signal analyzer 202 measures the power of the peak frequency at the input of the first LNA 120a. As the gain of the first PA 116a is varied and the signal generated by the LO 110 is modulated, the power of the signal detected by the signal analyzer 202 at the first LNA 120a reduces in magnitude as shown in FIG. 6.

Figure 7:
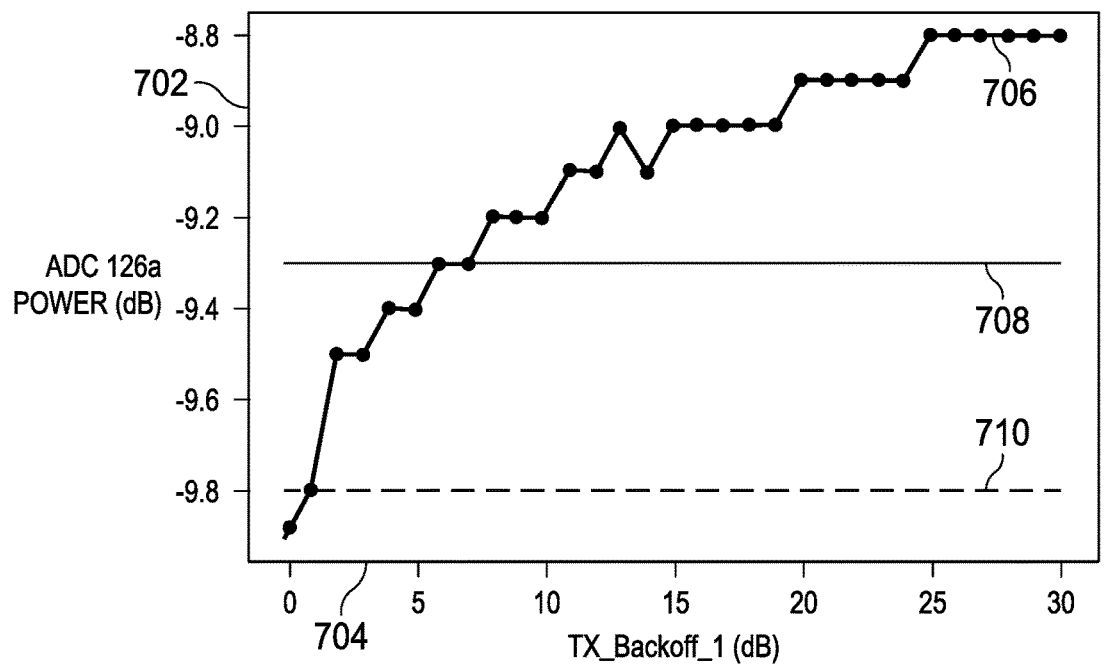
FIG. 7 is a graphical illustration of an example analog-to-digital converter (ADC) power output versus PA gain plot.

FIG. 7 is a graphical illustration of an example analog-to-digital converter (ADC) power output versus PA gain plot 700. The example ADC power output versus PA gain plot 700 is representative of power of the peak frequency detected by the signal analyzer 202 at the first ADC 126a versus the gain of the first PA 116a as the example modulator manager 200 varies the TX_Backoff_1 variable. The ADC power output versus PA gain plot 700 includes an example ADC power axis 702, an example PA gain axis 704, an example ADC_LNA compression curve 706, an example 0.5 dB variation curve 708, and an example 1 dB variation curve 710. During some operation of an amplifier, the input power to an amplifier (e.g., the first LNA 120a) has a linear relationship to the output power of the amplifier (e.g., the first LNA 120a). Compression occurs when the input power to the amplifier increases to a level that causes the output power of the amplifier to have a non-linear relationship to the output of the amplifier.

In the illustrated example of FIG. 7, the ADC_LNA compression curve 706 is representative of the output of the first ADC 126a measured by the signal analyzer 202. The power output of the first ADC 126a corresponds to the power output of the first LNA 120a. As the modulator manager 200 adjusts the gain of the first PA 116a and the signal generated by the LO 110 is modulated, the signal analyzer 202 measures the power of the peak frequency output by the first LNA 120a at the first ADC 126a. After collecting the power of the peak frequency at the first ADC 126a across the varied gain of the first PA 116a, the example signal analyzer 202 determines the maximum (e.g., maximum with respect to the sampled data as shown in FIG. 7) power of the first ADC 126a (e.g., corresponding to the maximum power of the first LNA 120a), the power that is 0.5 dB below the maximum power of the first ADC 126a, and the power that is 1 dB below the maximum power of the first ADC 126a. In the illustrated example of FIG. 7, the 0.5 dB variation curve 708 represents the power at which the power of the first ADC 126a is 0.5 dB below the maximum power of the first ADC 126a (e.g., corresponding to the power of the first LNA 120a that is 0.5 dB below the maximum power of the first LNA 120a). In the illustrated example of FIG. 7, the 1 dB variation curve 710 represents the power at which the power of the first ADC 126a is 1 dB below the maximum power of the first ADC 126a (e.g., corresponding to the power of the first LNA 120a that is 1 dB below the maximum power of the first LNA 120a).

Figure 8:
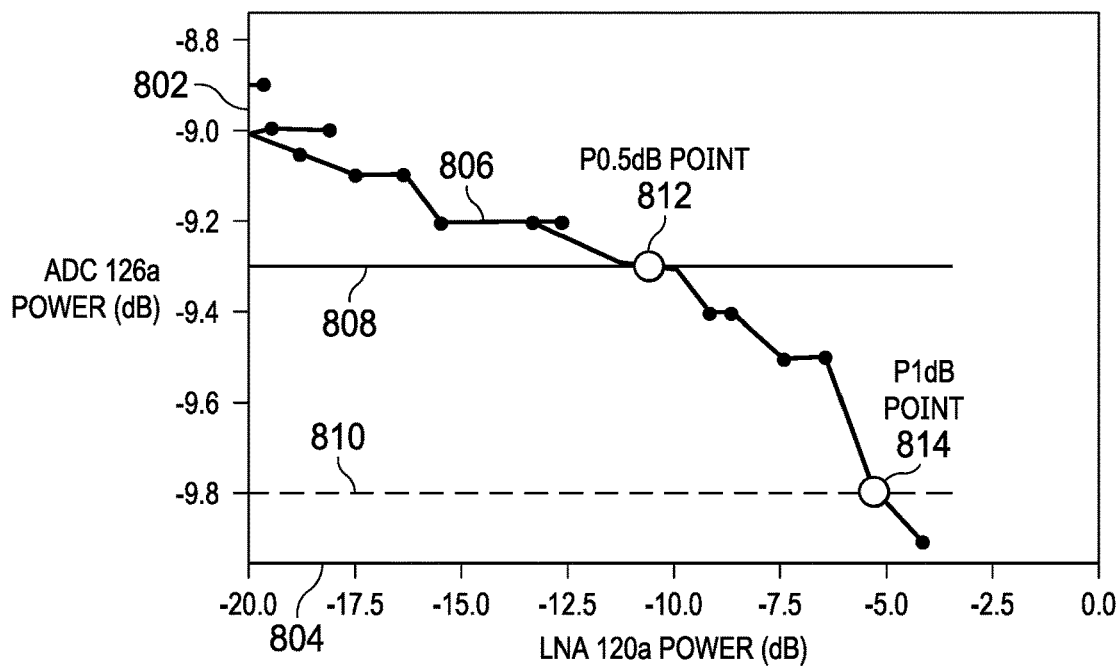
FIG. 8 is a graphical illustration of an example ADC power output versus LNA power output plot.

FIG. 8 is a graphical illustration of an example ADC power output versus LNA power input plot 800. The example ADC power output versus LNA power input plot 800 is representative of power of the peak frequency detected by the signal analyzer 202 from the first ADC 126a versus the power of the peak frequency detected by the signal analyzer 202 at the first LNA 120a as the example modulator manager 200 varies the TX_Backoff_1 variable. The ADC power output versus LNA power input plot 800 includes an example ADC power axis 802, an example LNA power axis 804, an example ADC_LNA compression curve 806, an example 0.5 dB variation curve 808, an example 1 dB variation curve 810, and example P0.5 dB point 812, and an example P1 dB point 814. In the illustrated example of FIG. 8, the ADC_LNA compression curve 806 is representative of the output of the first LNA 120a measured by the signal analyzer 202 at the first ADC 126a. As the modulator manager 200 adjusts the gain of the first PA 116a, the signal analyzer 202 measures the power of the peak frequency output by the first LNA 120a at the first ADC 126a. The P0.5 dB point 812 is at the point where the ADC_LNA compression curve 806 intersects with the 0.5 dB variation curve 808. The P0.5 dB point 812 is representative of the power output of the first ADC 126a that corresponds to the gain value of the first LNA 120a when the power output of the first ADC 126a is 0.5 dB below its expected maximum power. The P1 dB point 814 is at the point where the ADC LNA compression curve 806 intersects with the 1 dB variation curve 810. The P1 dB point 814 is representative of the power output of the first ADC 126a that corresponds to the gain value of the first LNA 120a when the power output of the first ADC 126a is 1 dB below its maximum value.

In the illustrated example of FIG. 8, by combining the first LNA 120a data represented in FIG. 6 with the first ADC 126a data represented in FIG. 7, the example signal analyzer 202 circumvents the attenuation caused by the first filter 124a and reliably detects the P0.5 dB point 812 and the P1 dB point 814. In some examples, the example modulator manager 200 can disable the second PA 116b and enable the internal loopback path between the second phase shifter 114b and the first LNA 120a, continuously vary the phase of the signal generated by the LO 110 with the second phase shifter 114b, and compute the same data represented in FIGS. 6, 7, and 8. By enabling the internal loopback path between the second phase shifter 114b and continuously varying the phase of the signal generated by the LO 110 with the second phase shifter 114b, the modulator manager 200 enables the signal analyzer 202 to reduce the interference in the detected signals (e.g., caused by intra-chip leakage) and generate more accurate analysis of performance characteristics.

While an example manner of implementing the RADAR controller 108 of FIG. 1 is illustrated in FIG. 2, one or more of the elements, processes and/or devices illustrated in FIG. 2 may be combined, divided, re-arranged, omitted, eliminated and/or implemented in any other way. Further, the example modulator manager 200, the example signal analyzer 202, the example alert generator 204 and/or, more generally, the RADAR controller 108 of FIG. 2 may be implemented by hardware, software, firmware and/or any combination of hardware, software and/or firmware. Thus, for example, any of the example modulator manager 200, the example signal analyzer 202, the example alert generator 204 and/or, more generally, the RADAR controller 108 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example modulator manager 200, the example signal analyzer 202, the example alert generator 204 and/or, more generally, the RADAR controller 108 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the RADAR controller 108 of FIGS. 1 and 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the RADAR controller 108 of FIGS. 1 and 2 are shown in FIGS. 9, 10, 11, and 12. The example machine readable instructions may be one or more executable programs or portion(s) of an executable program for execution by a computer processor such as the RADAR controller 108 discussed in connection with FIGS. 1 and 2. The example program may be embodied in software stored on a non-transitory computer readable storage medium such as a CD-ROM, a floppy disk, a hard drive, a DVD, a Blu-ray disk, or a memory associated with the RADAR controller 108, but the entire program and/or parts thereof could alternatively be executed by a device other than the RADAR controller 108 and/or embodied in firmware or dedicated hardware. Further, although the example program is described with reference to the flowcharts illustrated in FIGS. 9, 10, 11, and 12, many other methods of implementing the RADAR controller 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 9, 10, 11, and 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 9:
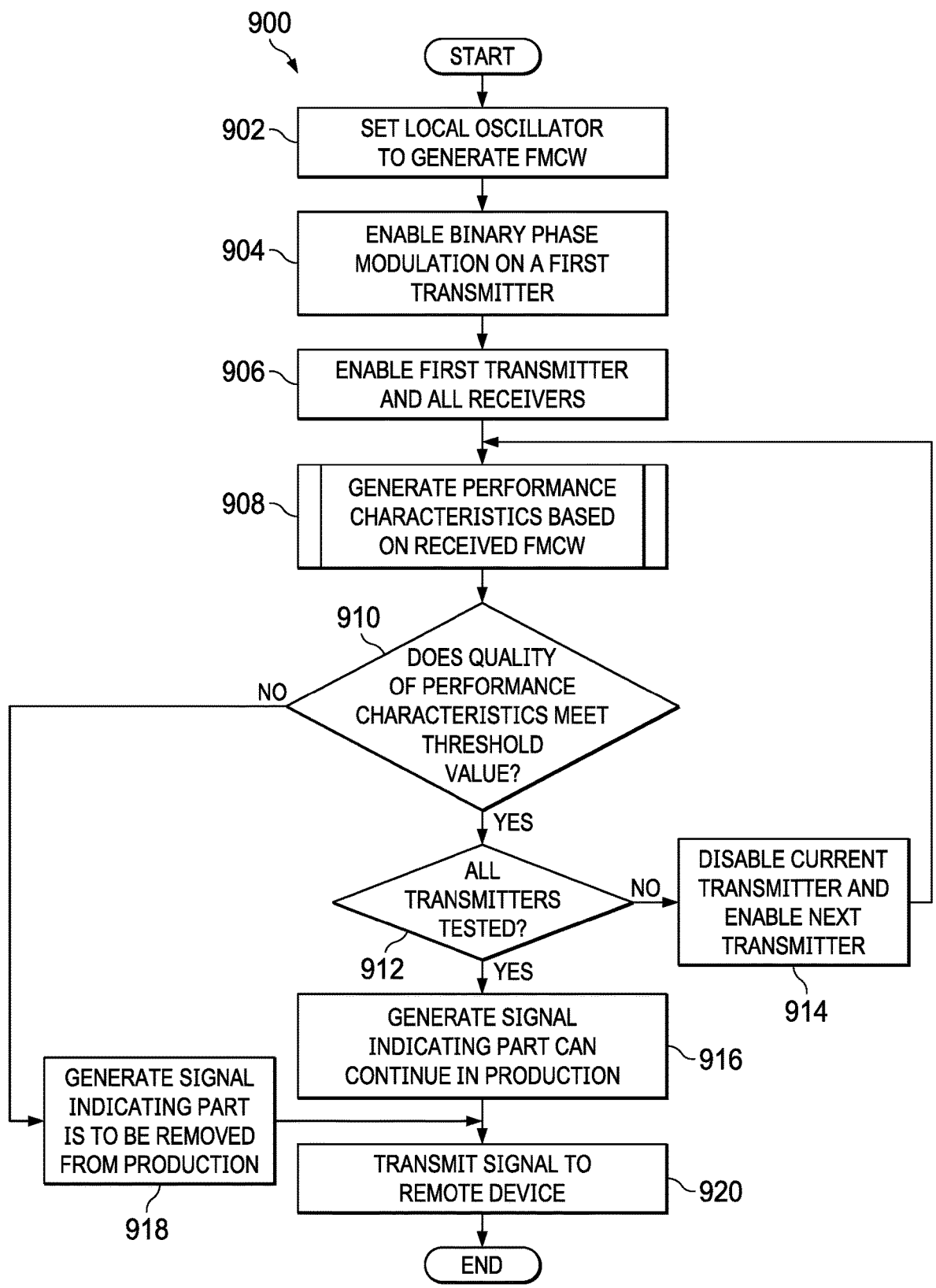
FIG. 9 is a flowchart representative of example machine readable instructions which may be executed to implement the radar controller of FIGS. 1 and 2 to test the radar SoC.

FIG. 9 is a flowchart representative of example machine readable instructions which may be executed to implement the RADAR controller 108 of FIGS. 1 and 2 to test the RADAR SoC 102. For example, the example machine readable instructions of FIG. 9 may be executed to test a RADAR SoC (e.g., the RADAR SoC 102) to determine performance characteristics related to the ability of a RADAR SoC to determine distance, receiver signal quality of a RADAR SoC, and gain and phase mismatch of transmitters and receivers of a RADAR SoC.

In the illustrated example of FIG. 9, the example machine readable instructions 900 of FIG. 9 begin at block 902 where the example modulator manager 200 sets the LO 110 (e.g., the example modulator manager 200 is setting a local oscillator generator) to generate a FMCW. For example, the modulator manager 200 sets the LO 110 to generate a 77 GHz to 81 GHz continuous waveform over a period of 130 μs. At block 904, the example modulator manager 200 enables binary phase modulation on a first transmitter. For example, the example modulator manager 200 enables binary phase modulation at a frequency of 1 MHz on the first PA 116a. At block 906, the example modulator manager 200 enables a first transmitter to transmit and all receivers to receive a signal generated by a local oscillator. For example, the modulator manager 200 enables the first PA 116a to transmit the signal generated by the LO 110 and the modulator manager 200 enables the first LNA 120a, the second LNA 120b, the third LNA 120c, and the fourth LNA 120d.

In the illustrated example of FIG. 9, at block 908, the example signal analyzer 202 generates performance characteristics for the receivers under test based on the transmitted signal received at each of the receivers. For example, the example signal analyzer 202 generates performance metrics for the first receiver 118a, the second receiver 118b, the third receiver 118c, and the fourth receiver 118d based on the FMCW received at each of the first receiver 118a, the second receiver 118b, the third receiver 118c, and the fourth receiver 118d. Additionally, the example signal analyzer 202 denotes the performance characteristics for the receivers under test as relating to the current transmitter under test (e.g., the first transmitter, the second transmitter, the nth transmitter, etc.).

At block 910, the example alert generator 204 determines whether the quality of the performance characteristics for the transmitter and receivers currently under test meet a threshold value of performance. If the alert generator 204 determines that the performance characteristics for transmitter and receivers currently under test meet the threshold value (block 910: YES), the machine readable instructions 900 proceed to block 912. If the alert generator 204 determines that the performance characteristics for the transmitter and receivers currently under test do not meet the threshold value of performance (block 910: NO), the machine readable instructions 900 proceed to block 918.

At block 912, the example signal analyzer 202 determines whether all the transmitters in the RADAR SoC under test have been tested. If the example signal analyzer 202 determines that all the transmitters have not been tested (block 912: NO), the machine readable instructions 900 proceed to block 914. If the example signal analyzer 202 determines that all the transmitters have been tested (block 912: YES), the machine readable instructions 900 proceed to block 916. At block 914, the example modulator manager 200 disables the current transmitter under test and enables the next transmitter to be tested. For example, the modulator manager 200 disables the first PA 116a and enables the second PA 116b. After block 914, the machine readable instructions 900 proceed to block 908. At block 916, the example alert generator 204 generates a signal indicating the RADAR SoC under test can continue in production. At block 918, the example alert generator 204 generates a signal indicating the RADAR SoC under test is to be removed from production. At block 920, the example alert generator 204 transmits one or more of the signal indicating the RADAR SoC under test can continue in production or the signal indicating the RADAR SoC under test is to be removed from production to a remote device, for example, the remote device 106. After block 920, the machine readable instructions 900 end.

Figure 10:
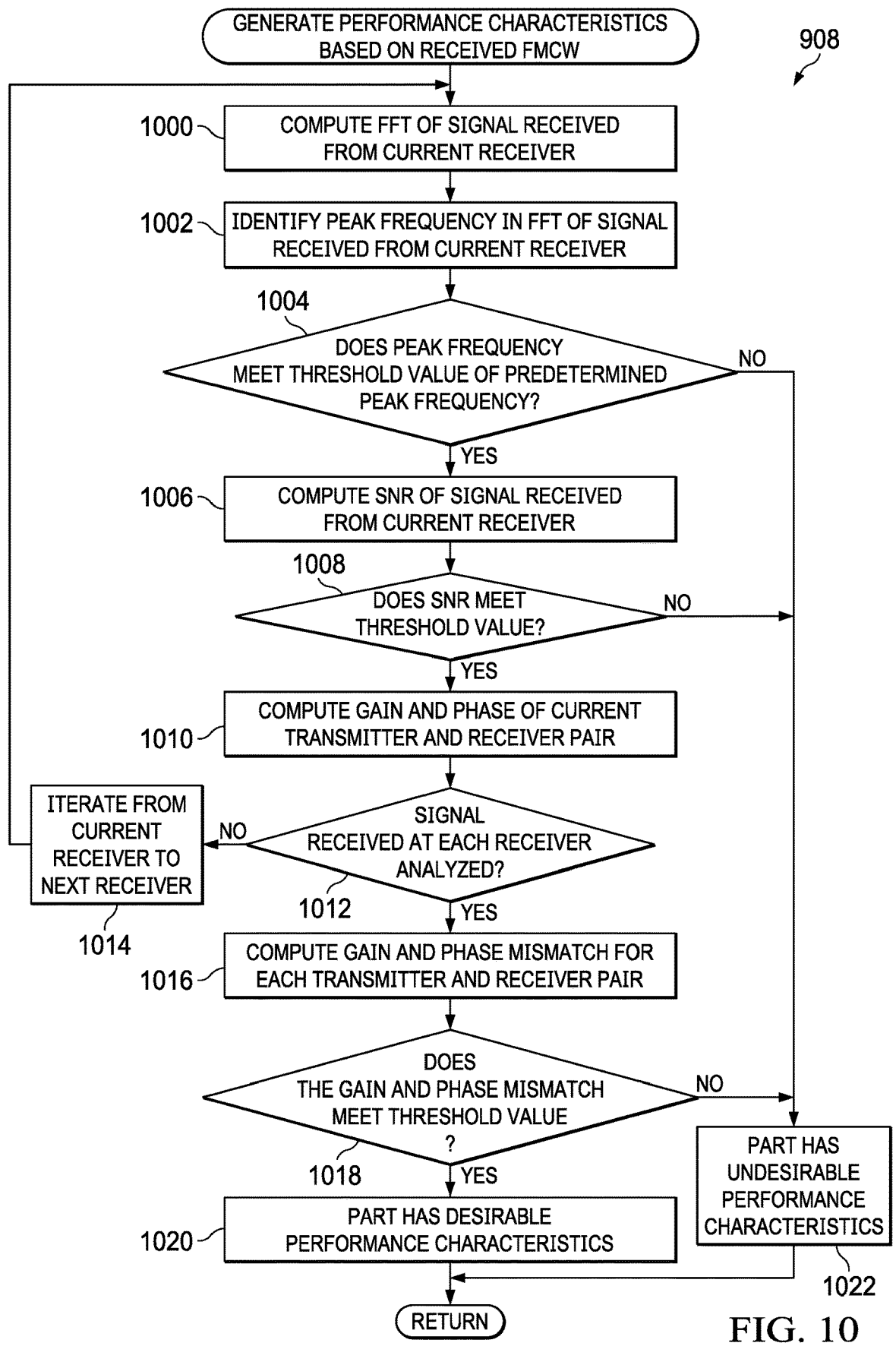
FIG. 10 is a flowchart representative of example machine readable instructions which may be executed to implement the radar controller of FIGS. 1 and 2 to generate performance characteristics of the radar SoC.

FIG. 10 is a flowchart representative of example machine readable instructions which may be executed to implement the RADAR controller 108 of FIGS. 1 and 2 to generate performance characteristics of the RADAR SoC (e.g., the RADAR SoC 102) at block 908 of FIG. 9. The sub-routine of block 908 begins at block 1000 where the example signal analyzer 202 computes an FFT on the signal received from the current receiver under test in the RADAR SoC under test. For example, the signal analyzer 202 computes an FFT on the signal received from the first ADC 126a. At block 1002, the example signal analyzer 202 identifies the peak frequency in the FFT corresponding to the signal received from the current receiver under test in the RADAR SoC under test. At block 1004, the example signal analyzer 202 determines whether the peak frequency in the FFT corresponding to the signal received from the current receiver under test meets a threshold value of a predetermined peak frequency. For example, the signal analyzer 202 determines whether the peak frequency in the FFT corresponding to the signal received from the first receiver 118a is within 4 kHz of a predetermined peak frequency (e.g., 10 kHz). If the example signal analyzer 202 determines that the peak frequency meets a threshold value of the predetermined peak frequency (block 1004: YES), the sub-routine of block 908 proceeds to block 1006. If the example signal analyzer 202 determines that the peak frequency does not meet a threshold value of the predetermined peak frequency (block 1004: NO), the sub-routine of block 908 proceeds to block 1022.

In the illustrated example of FIG. 10, at block 1006, the example signal analyzer 202 computes the SNR of the signal received from the current receiver under test in the RADAR SoC under test. For example, the signal analyzer 202 computes the SNR of the signal received from the first ADC 126a. At block 1008, the example signal analyzer 202 determines whether the SNR for the signal received from the current receiver under test meets a threshold value. For example, the threshold value corresponds to an SNR value that is high enough to ensure that the RADAR SoC under test has sufficient clarity (e.g., resolution) to detect objects at a distance. If the example signal analyzer 202 determines that the SNR of the signal received from the current receiver under test meets (e.g., is at or above) the threshold value, (block 1008: YES), the sub-routine of block 908 proceeds to block 1010. If the example signal analyzer 202 determines that the SNR of the signal received from the current receiver under test does not meet (e.g., is below) the threshold value, (block 1008: NO), the sub-routine of block 908 proceeds to block 1022. At block 1010, the example signal analyzer 202 computes the gain and phase for the current transmitter and receiver pair under test. For example, the signal analyzer 202 computes the gain and phase of the first transmitter 112a and first receiver 118a pair.

In the example of FIG. 10, at block 1012, the example signal analyzer 202 determines whether the signal received at each receiver has been analyzed. For example, the signal analyzer 202 determines whether the FMCW received at each of the first receiver 118a, the second receiver 118b, the third receiver 118c, and the fourth receiver 118d has been analyzed. If the signal analyzer 202 determines that any of the signals received at each of the first receiver 118a, the second receiver 118b, the third receiver 118c, and the fourth receiver 118d have not been analyzed (block 1012: NO), the sub-routine of block 908 proceeds to block 1014. However, if the signal analyzer 202 determines that the signals received at each of the first receiver 118a, the second receiver 118b, the third receiver 118c, and the fourth receiver 118d have been analyzed (block 1012: YES), the sub-routine of block 908 proceeds to block 1016.

In the example of FIG. 10, at block 1014, the example signal analyzer 202 iterates from the current receiver under to test to another receiver to be tested. For example, if the signal analyzer 202 is currently analyzing the third receiver 118c and determines, at block 1012, that the signals received from each of the first receiver 118a, the second receiver 118b, and the third receiver 118c have been analyzed, but that the signal received from the fourth receiver 118d has not been analyzed, the signal analyzer 202, at block 1014, iterates from analyzing the signal received from the third receiver 118c to analyzing the signal received from the fourth receiver 118d. After block 1014, the sub-routine of block 908 proceeds to block 1000.

In the illustrated example of FIG. 10, at block 1016, the example signal analyzer 202 computes the gain and phase mismatch for each transmitter and receiver pair. For example, the signal analyzer 202 computes the gain and phase mismatch between a reference transmitter receiver pair (e.g., the first transmitter 112a and the first receiver 118a) and the other transmitter and receiver pairs (e.g. a mth transmitter and an nth receiver). At block 1018, the example signal analyzer 202 determines whether the gain and phase mismatch of each transmitter and receiver pair meets a threshold value. For example, the threshold value corresponds to acceptable mismatch between transmitter and receiver pairs that allows for the example RADAR SoC under test to maintain proper operation. If the example signal analyzer 202 determines that the gain and phase mismatch for all of the transmitter and receiver pairs meets (e.g., is at or below) the threshold value (block 1018: YES), the sub-routine of block 908 proceeds to block 1020. If the example signal analyzer 202 determines that the gain and phase mismatch for any of the transmitter and receiver pairs does not meet (e.g., is above) the threshold value (block 1018: NO), the sub-routine of block 908 proceeds to block 1022.

In the illustrated example of FIG. 10, at block 1020, the example signal analyzer 202 indicates that the RADAR SoC under test has desirable performance characteristics. For example, desirable performance characteristics correspond to acceptable operational characteristics that are satisfactory to expected performance in an application. After block 10120, the example sub-routine of block 908 returns to the machine readable instructions 900 at block 910. At block 1022, the example signal analyzer 202 indicates that the RADAR SoC under test has undesirable performance characteristics. For example, undesirable performance characteristics correspond to unacceptable operational characteristics that are not satisfactory to expected performance in an application. After block 1022, the example sub-routine of block 908 returns to the machine readable instructions 900 at block 910.

Figure 11:
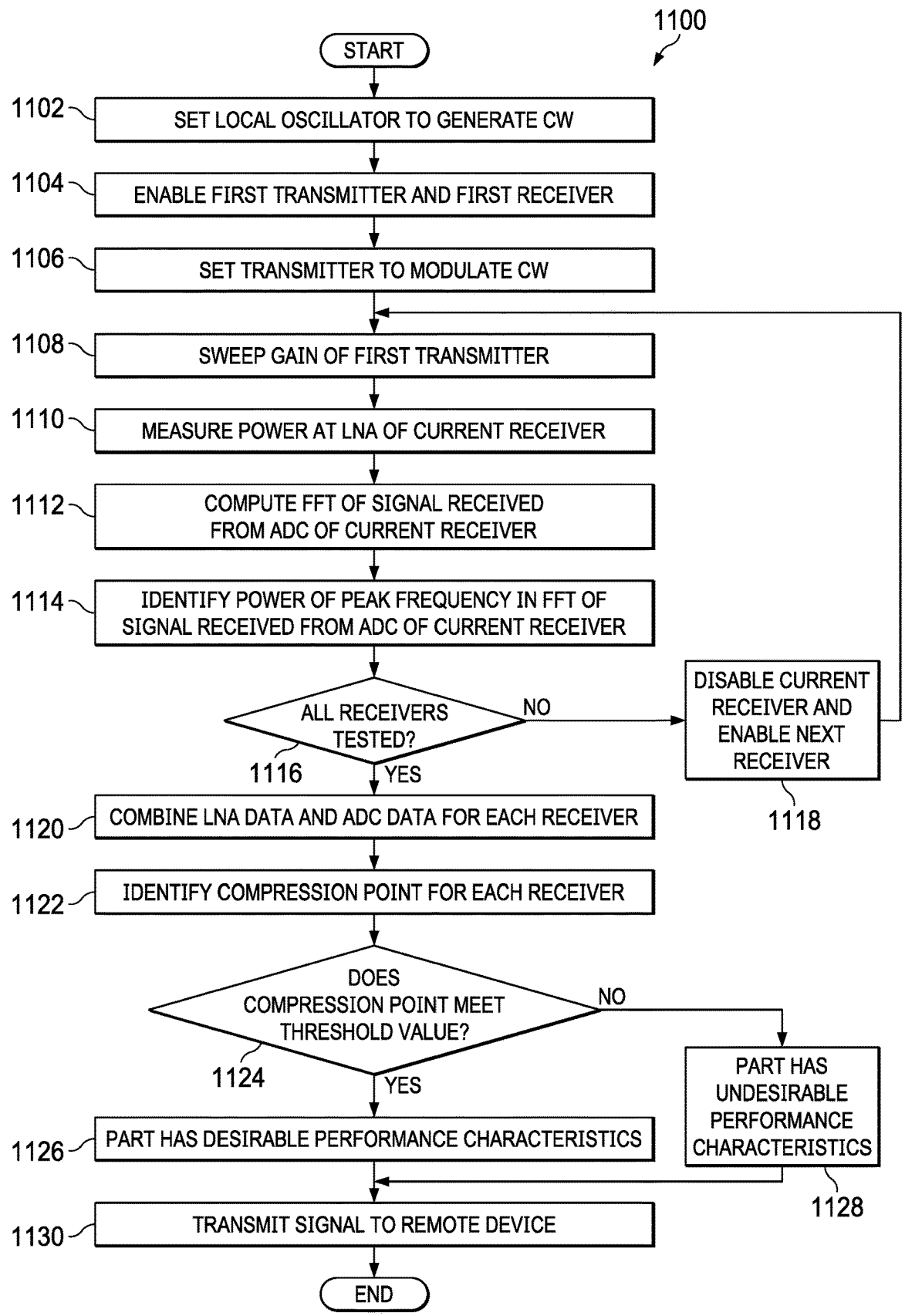
FIG. 11 is a flowchart representative of example machine readable instructions which may be executed to implement the radar controller of FIGS. 1 and 2 to alternatively test the radar SoC.

FIG. 11 is a flowchart representative of example machine readable instructions which may be executed to implement the RADAR controller 108 of FIGS. 1 and 2 to alternatively test the RADAR SoC 102. For example, the example machine readable instructions of FIG. 11 may be executed to test a RADAR SoC (e.g., the RADAR SoC 102) to determine performance characteristics related to the linearity of the gain of one or more power amplifiers in the RADAR SoC under test. The example machine readable instructions 1100 begins at block 1102 where the example modulator manager 200 sets a local oscillator to generate a CW. For example, the example modulator manager 200 sets the LO 110 to generate a CW at 77 GHz. At block 1104, the example modulator manager 200 enables a first transmitter and a first receiver. For example, the example modulator manager 200 enables the first PA 116a and the first LNA 120a. At block 1106, the example modulator manager 200 sets the first transmitter to modulate the CW by a predetermined frequency. For example, the predetermined frequency may be 10 kHz. For example, at block 1106, the example modulator manager 200 sets the first PA 116a to modulate the CW with binary phase modulation. In other examples, at block 1106, the example modulator manager 200 sets the first phase shifter 114a to adjust the phase of the CW at a constant rate (e.g., 360°/100 µs).

In the illustrated example of FIG. 11, at block 1108, the example modulator manager 200 sweeps the gain of the first transmitter. For example, the modulator manager 200 sweeps the TX_Backoff_1 variable of the first PA 116a from 0 dB to 30 dB. At block 1110, the example signal analyzer 202 measures the power at the LNA of the current receiver under test. For example, the signal analyzer 202 measures the power of the peak frequency at the first LNA 120a with a millimeter wave peak detector. At block 1112, the example signal analyzer 202 computes an FFT of the signal received from the ADC of the current receiver under test. For example, the signal analyzer 202 computes the FFT of the signal received from the first ADC 126a. At block 1114, the example signal analyzer 202 identifies the power of the peak frequency in the FFT corresponding to the signal received from the current receiver under test. For example, the signal analyzer 202 identifies the power of the peak frequency in the FFT corresponding to the signal received from the first ADC 126a. At block 1116, the example signal analyzer 202 determines whether all the receivers under test have been tested. If the example signal analyzer 202 determines that all the receivers under test have been tested (block 1116: YES), the machine readable instructions 1100 proceeds to block 1120. If the example signal analyzer 202 determines that all the receivers under test have not been tested (block 1116: NO), the machine readable instructions 1100 proceeds to block 1118.

In the illustrated example of FIG. 11, at block 1118, the example modulator manager 200 disables the current receiver under test and enables the next receiver to be tested. For example, the modulator manager 200 disables the first LNA 120a and enables the second LNA 120b. After block 1118, the machine readable instructions 1100 proceeds to block 1108. At block 1120, the example signal analyzer 202 combines the LNA data and the ADC data for each receiver. For example, at block 1120, the example signal analyzer 202 populates a data structure associating the power of the peak frequency at the first ADC 126a with respect to the power of the peak frequency at the first LNA 120a. At block 1122, the example signal analyzer 202 identifies a compression point for each receiver (e.g., a compression point for the LNA of each receiver). For example, the example signal analyzer 202 identifies the P1 dB point as measured at the first ADC 126a. The P1 dB point corresponds to the LNA power at which the power of the ADC is 1 dB below the maximum power of the ADC. In additional or alternative examples, the example signal analyzer 202 identifies the P0.5 dB point as measured at the first ADC 126a. The P0.5 dB point corresponds to the LNA power at which the power of the ADC is 0.5 dB below the maximum power of the ADC.

In the illustrated example of FIG. 11, at block 1124, the example signal analyzer 202 determines whether the compression point meets a threshold value. For example, the signal analyzer determines whether the P1 dB point meets a threshold value. In additional or alternative examples, the example signal analyzer 202 determines whether the P0.5 dB point meets a threshold value. If the example signal analyzer 202 determines that the compression point meets a threshold value (block 1124: YES), the machine readable instructions 1100 proceeds to block 1126. If the example signal analyzer 202 determines that the compression point does not meet a threshold value (block 1124: NO), the machine readable instructions 1100 proceeds to block 1128. In additional or alternative examples, block 1124 is repeated for an alternative compression point.

In the illustrated example of FIG. 11, at block 1126, the example signal analyzer 202 indicates that the RADAR SoC under test has desirable performance characteristics. After block 1126, the machine readable instructions 1100 proceeds to block 1130. At block 1128, the example signal analyzer 202 indicates that the RADAR SoC under test has undesirable performance characteristics. After block 1126, the machine readable instructions 1100 proceeds to block 1130. At block 1130, the example alert generator 204 transmits a signal to the remote device 106 based on the quality of performance characteristics. After block 1130, the example machine readable instructions 1100 ends.

Figure 12:
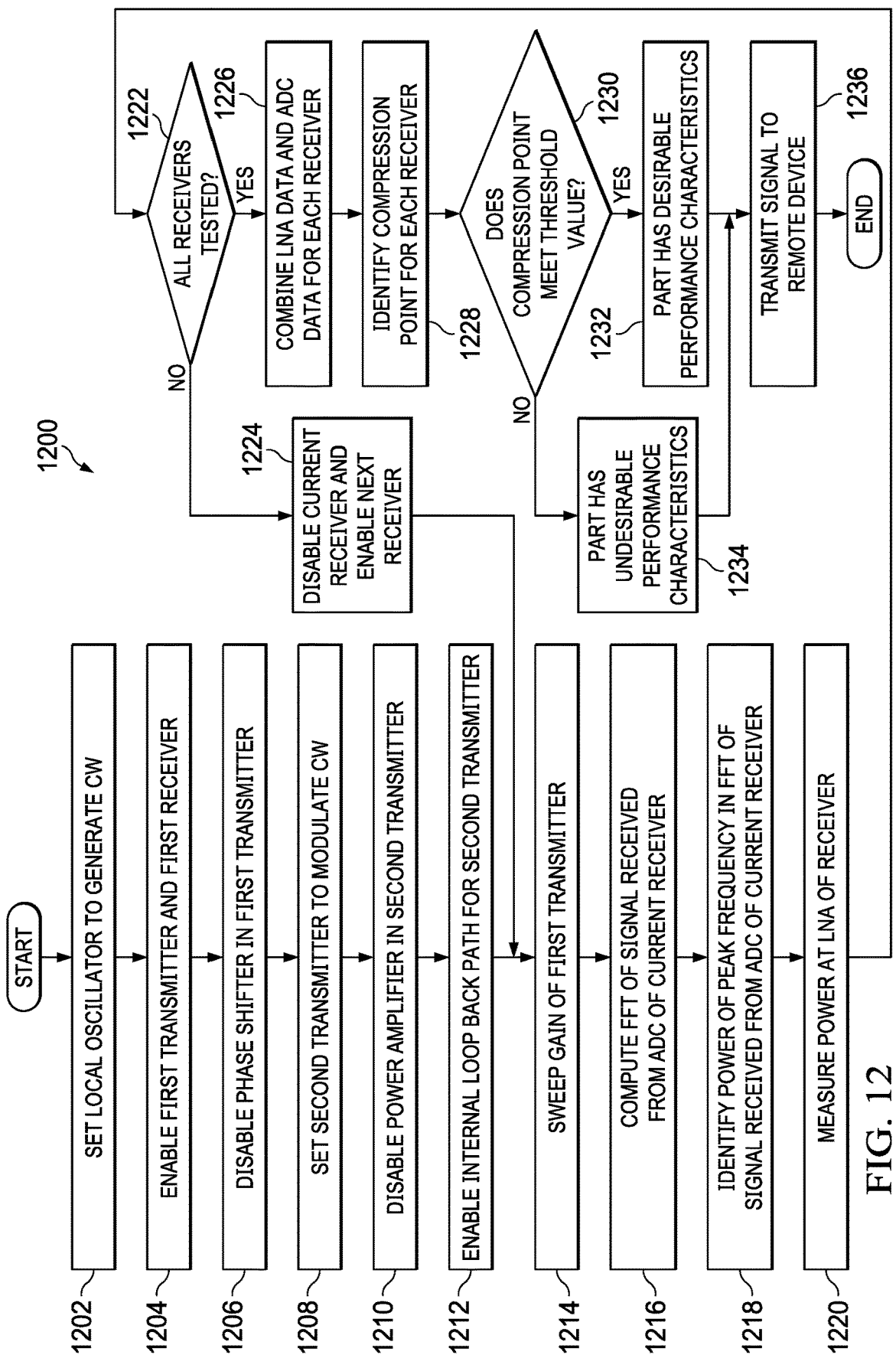
FIG. 12 is a flowchart representative of example machine readable instructions which may be executed to implement the radar controller of FIGS. 1 and 2 to alternatively test the radar SoC.

FIG. 12 is a flowchart representative of example machine readable instructions which may be executed to implement the RADAR controller 108 of FIGS. 1 and 2 to alternatively test the RADAR SoC 102. For example, the example machine readable instructions of FIG. 12 may be executed to test a RADAR SoC (e.g., the RADAR SoC 102) to determine performance characteristics related to the linearity of the gain of one or more power amplifiers in the RADAR SoC under test. The example machine readable instructions 1200 begins at block 1202 where the example modulator manager 200 sets a local oscillator to generate a CW. For example, the example modulator manager 200 sets the LO 110 to generate a CW at 77 GHz. At block 1204, the example modulator manager 200 enables a first transmitter and a first receiver. For example, the example modulator manager 200 enables the first PA 116a and the first LNA 120a. At block 1206, the example modulator manager 200 disables the phase shifter of the first transmitter. For example, the modulator manager 200 disables the first phase shifter 114a. At block 1208, the example modulator manager 200 sets a second transmitter to modulate the CW by a predetermined frequency. For example, the predetermined frequency may be 10 kHz. For example, at block 1208, the example modulator manager 200 sets the second PA 116b to modulate the CW with binary phase modulation. In other examples, at block 1208, the example modulator manager 200 sets the second phase shifter 114b to adjust the phase of the CW at a constant rate (e.g., 360°/100 μs).

In the illustrated example of FIG. 12, at block 1210 the example modulator manager 200 disables the power amplifier of the second transmitter. For example, the modulator manager 200 disables the second PA 116b. At block 1212, the example modulator manager 200 enables an internal loopback path between the second transmitter and the first receiver. For example, the modulator manager 200 enables an internal loopback path between the second phase shifter 114b and the first LNA 120a. At block 1214, the example modulator manager 200 sweeps the gain of the first transmitter. For example, the modulator manager 200 sweeps the TX_Backoff_1 variable of the first PA 116a from 0 dB to 30 dB. At block 1216, the example signal analyzer 202 computes an FFT of the signal received from the ADC of the current receiver under test. For example, the signal analyzer 202 computes the FFT of the signal received from the first ADC 126a. At block 1218, the example signal analyzer 202 identifies the power of the peak frequency in the FFT corresponding to the signal received from the current receiver under test. For example, the signal analyzer 202 identifies the power of the peak frequency in the FFT corresponding to the signal received from the first ADC 126a. At block 1220, the example signal analyzer 202 measures the power at the LNA of the receiver. For example, the signal analyzer 202 measures the power of the peak frequency at the first LNA 120a with a millimeter wave peak detector. At block 1222, the example signal analyzer 202 determines whether all the receivers under test have been tested. If the example signal analyzer 202 determines that all the receivers under test have been tested (block 1222: YES), the machine readable instructions 1200 proceeds to block 1226. If the example signal analyzer 202 determines that all the receivers under test have not been tested (block 1222: NO), the machine readable instructions 1200 proceeds to block 1224.

In the illustrated example of FIG. 12, at block 1224 the example modulator manager 200 disables the current receiver under test and enables the next receiver to be tested. For example, the modulator manager 200 disables the first LNA 120a and enables the second LNA 120b. After block 1224, the machine readable instructions 1200 proceeds to block 1214. At block 1226, the example signal analyzer 202 combines the LNA data and the ADC data for each receiver. For example, at block 1226, the example signal analyzer 202 populates a data structure associating the power of the peak frequency at the first ADC 126a with respect to the power of the peak frequency at the first LNA 120a. At block 1228, the example signal analyzer 202 identifies a compression point for each receiver. For example, the example signal analyzer 202 identifies the P1 dB point as measured at the first ADC 126a. The P1 dB point corresponds to the LNA power at which the power of the ADC is 1 dB below the maximum power of the ADC. In additional or alternative examples, the example signal analyzer 202 identifies the P0.5 dB point as measured at the first ADC 126a. The P0.5 dB point corresponds to the LNA power at which the power of the ADC is 0.5 dB below the maximum power of the ADC.

In the illustrated example of FIG. 12, at block 1230, the example signal analyzer 202 determines whether the compression point meets a threshold value. For example, the example signal analyzer 202 determines whether the P1 dB point meets a threshold value. In additional or alternative examples, the example signal analyzer 202 determines whether the P0.5 dB point meets a threshold value. If the example signal analyzer 202 determines that the compression point meets a threshold value (block 1230: YES), the machine readable instructions 1200 proceeds to block 1232. If the example signal analyzer 202 determines that the compression point does not meet a threshold value (block 1230: NO), the machine readable instructions 1200 proceeds to block 1234. In additional or alternative examples, block 1230 is repeated for a P0.5 dB point.

In the illustrated example of FIG. 12, at block 1232, the example signal analyzer 202 indicates that the RADAR SoC under test has desirable performance characteristics. After block 1232, the machine readable instructions 1200 proceeds to block 1236. At block 1234, the example signal analyzer 202 indicates that the RADAR SoC under test has undesirable performance characteristics. After block 1234, the machine readable instructions 1200 proceeds to block 1236. At block 1236, the example alert generator 204 transmits a signal to the remote device 106 based on the quality of performance characteristics. After block 1236, the example machine readable instructions 1200 ends.

From the foregoing, it will be appreciated that example methods, apparatus and articles of manufacture have been disclosed that reduces the cost associated with testing RADAR integrated circuits. Additionally, the example methods, apparatus, and articles of manufacture disclosed herein provide high confidence testing of RADAR integrated circuits at production without the need for peripheral active electrical components. The examples disclosed herein allow for testing of RADAR SoC to measure distance at production. Furthermore, the examples disclosed herein provide testing of RADAR SoC with FMCW signals at production. Additionally, the examples disclosed herein provide testing RADAR SoC with FMCW signals, binary phase modulation, and phase shifting modulation. For example, conventional methods cannot test RADAR SoC at production because conventional methods rely on peripheral active electrical components to test the RADAR SoC. Furthermore, conventional methods cannot test RADAR SoC at production because the conventional methods do not account for intra-chip leakage and/or additional frequencies introduced by transmission networks (e.g., the transmission network 104).

Additionally from the foregoing, it will be appreciated that example methods, apparatus and articles of manufacture have been disclosed that reduce the need for expensive millimeter wave testing equipment. Furthermore, the examples disclosed herein measure P1 dB and/or other compression points using a combination of external transmission networks (e.g., the transmission network 104) and internal loopback paths (e.g., the first internal loopback path 115a, the second internal loopback path 115b). Furthermore, the disclosed examples allow for testing RADAR SoC with built in transmitters in the RADAR SoC under test. The disclosed methods, apparatus and articles of manufacture improve the efficiency of using a computing device by reducing power wasted continuing to produce RADAR SoCs that are defective by testing RADAR SoCs at production. The disclosed methods, apparatus, and articles of manufacture improve the efficiency of using a computing device by reducing computational waste associated with processing radio frequency signals connected by defective RADAR SoCs. The disclosed methods, apparatus and articles of manufacture are accordingly directed to one or more improvement(s) in the functioning of a computer.

Example methods, apparatus, systems, and articles of manufacture to test radar integrated circuits are disclosed herein. Further examples and combinations thereof include the following: example 1 includes a radar circuit comprising a local oscillator (LO), a transmitter coupled to the LO and configured to be coupled to a transmission network, a receiver configured to be coupled to the transmission network, and a controller coupled to the LO, the transmitter, and the receiver, the controller to cause the LO to generate a frequency modulated continuous waveform (FMCW), cause the transmitter to modulate the FMCW as a modulated FMCW, cause the transmitter to transmit the modulated FMCW via the transmission network and the receiver to obtain a received FMCW from the transmission network, and in response to obtaining the received FMCW from the receiver, generate a performance characteristic of the radar circuit based on the received FMCW.

Example 2 includes the radar circuit of example 1, wherein the controller is to test the radar circuit at production of the radar circuit.

Example 3 includes the radar circuit of example 1, wherein the controller is to cause the transmitter to modulate the FMCW via a binary phase modulation.

Example 4 includes the radar circuit of example 1, wherein the FMCW is a signal that ramps from about seventy-seven gigahertz to about eighty-one gigahertz.

Example 5 includes the radar circuit of example 1, wherein the receiver is a first receiver, the radar circuit further including a second receiver, and wherein the performance characteristic includes a characteristic from a group consisting of a signal to noise ratio of the received FMCW at one of the first receiver or the second receiver, signal power of the received FMCW at one of the first receiver or the second receiver, and gain and phase mismatch between the first receiver and the second receiver.

Example 6 includes the radar circuit of example 5, wherein the controller is to transmit a status signal to a device to cause the device to act on the radar circuit based on a quality of the performance characteristic and when the status signal indicates that the radar circuit is to be removed from production, the device is to remove the radar circuit from production.

Example 7 includes the radar circuit of example 6, wherein the quality of the performance characteristic is based on a threshold value corresponding to a characteristic from a group consisting of a value of the signal to noise ratio, a value for the signal power, and a value for the gain and phase mismatch.

Example 8 includes a method to test a radar circuit including an oscillator, a transmitter, and a receiver, the method comprising generating, by the oscillator, a frequency modulated continuous waveform (FMCW), modulating, by the transmitter, the FMCW to produce a modulated FMCW, transmitting, by the transmitter, the modulated FMCW via a transmission network, receiving, by the receiver, a received FMCW from the transmission network based on the modulated FMCW, and in response to the received FMCW, generating a performance characteristic of the radar circuit based on the received FMCW.

Example 9 includes the method of example 8, wherein the radar circuit under test is at production of the radar circuit.

Example 10 includes the method of example 8, wherein the transmitter modulates the FMCW via a binary phase modulation.

Example 11 includes the method of example 8, wherein the FMCW is a signal that ramps from about seventy-seven gigahertz to about eighty-one gigahertz.

Example 12 includes the method of example 8, wherein the receiver is a first receiver, the radar circuit further including a second receiver, and wherein the performance characteristic includes a characteristic from a group consisting of a signal to noise ratio of the received FMCW at one of the first receiver or the second receiver, signal power of the received FMCW at one of the first receiver or the second receiver, and gain and phase mismatch between the first receiver and the second receiver.

Example 13 includes the method of example 12, further including transmitting a status signal to a device to cause the device to act on the radar circuit based on a quality of the performance characteristic and when the status signal indicates that the radar circuit is to be removed from production, the device is to remove the radar circuit from production.

Example 14 includes the method of example 13, wherein the quality of the performance characteristic is based on a threshold value corresponding to a characteristic from a group consisting of a value of the signal to noise ratio, a value for the signal power, and a value for the gain and phase mismatch.

Example 15 includes an apparatus to test a radar circuit including an oscillator, a transmitter, and a receiver, the apparatus comprising a modulator manager to cause the oscillator to generate a frequency modulated continuous waveform (FMCW), cause the transmitter to modulate the FMCW as modulated FMCW, cause the transmitter to transmit the modulated FMCW via a transmission network and the receiver to obtain a received FMCW from the transmission network, and a signal analyzer to, in response to obtaining the received FMCW from the receiver, generate a performance characteristic of the radar circuit based on the FMCW.

Example 16 includes the apparatus of example 15, wherein the apparatus is to test the radar circuit at production of the radar circuit.

Example 17 includes the apparatus of example 15, wherein the modulator manager is to cause the transmitter to modulate the FMCW via a binary phase modulation.

Example 18 includes the apparatus of example 15, wherein the FMCW is a signal that ramps from about seventy-seven gigahertz to about eighty-one gigahertz.

Example 19 includes the apparatus of example 15, further including an alert generator to transmit a status signal to a device to act on the radar circuit based on a quality of the performance characteristic and when the status signal indicates that the radar circuit is to be removed from production, the device is to remove the radar circuit from production.

Example 20 includes the apparatus of example 15, wherein the receiver is a first receiver, the radar circuit further including a second receiver, and wherein the performance characteristic includes a characteristic from a group consisting of a signal to noise ratio of the received FMCW at one of the first receiver or the second receiver, signal power of the received FMCW at one of the first receiver or the second receiver, and gain and phase mismatch between the first receiver and the second receiver.

Example 21 includes a radar circuit comprising a local oscillator (LO), a first transmitter coupled to the LO and configured to be coupled to a transmission network, a receiver configured to be coupled to the transmission network, a second transmitter coupled to the LO and coupled to the receiver via a loopback path, and a controller coupled to the LO, the first transmitter, the second transmitter, and the receiver, the controller to cause the LO to generate a continuous waveform (CW), cause the first transmitter to transmit the CW via the transmission network, cause the receiver to obtain a first received CW from the transmission network, set the second transmitter to adjust a phase angle of the CW to produce a modulated CW, enable the second transmitter to transmit the modulated CW to the receiver via the loopback path, wherein the receiver is further to combine the first received CW from the first transmitter and the modulated CW from the second transmitter into a combined CW, and in response to obtaining the combined CW from the receiver, generate a performance characteristic of the radar circuit based on the combined CW.

Example 22 includes the radar circuit of example 21, wherein the controller is to test the radar circuit at production of the radar circuit.

Example 23 includes the radar circuit of example 21, wherein the CW is a signal with a frequency of about seventy-seven gigahertz.

Example 24 includes the radar circuit of example 21, wherein the performance characteristic includes a compression point of the receiver.

Example 25 includes the radar circuit of example 24, wherein the controller is to transmit a status signal to a device to cause the device to act on the radar circuit based on a quality of the performance characteristic.

Example 26 includes the radar circuit of example 25, wherein when the status signal indicates that the radar circuit is to be removed from production, the device is to remove the radar circuit from production.

Example 27 includes the radar circuit of example 25, wherein the quality of the performance characteristic is based on a threshold value corresponding to a value of the compression point.

Example 28 includes a method to test a radar circuit including an oscillator, a first transmitter, a second transmitter, and a receiver, the method comprising generating, the oscillator to generate a continuous waveform (CW), transmitting, by the first transmitter the CW via a transmission network and the receiver to obtain a first received CW from the transmission network, adjusting, by the second transmitter, a phase angle of the CW as a modulated CW, transmitting, by the second transmitter, the modulated CW to the receiver via a loopback path, the receiver to combine the first received CW from the first transmitter and the modulated CW into a combined CW, and in response to obtaining the combined CW from the receiver, generating a performance characteristic of the radar circuit based on the combined CW.

Example 29 includes the method of example 28, wherein the radar circuit under test is at production of the radar circuit.

Example 30 includes the method of example 28, wherein the CW is a signal with a frequency of about seventy-seven gigahertz.

Example 31 includes the method of example 28, wherein the performance characteristic includes a compression point of the receiver.

Example 32 includes the method of example 31, further including transmitting a status signal to a device to cause the device to act on the radar circuit based on a quality of the performance characteristic.

Example 33 includes the method of example 32, wherein when the status signal indicates that the radar circuit is to be removed from production, the device is to remove the radar circuit from production.

Example 34 includes the method of example 32, wherein the quality of the performance characteristic is based on a threshold value corresponding to a value of the compression point.

Example 35 includes an apparatus to test a radar circuit including an oscillator, a first transmitter, a second transmitter, and a receiver, the apparatus comprising a modulator manager to cause the oscillator to generate a continuous waveform (CW), cause the first transmitter to transmit the CW via a transmission network and the receiver to obtain a first received CW from the transmission network, cause the second transmitter to adjust a phase angle of the CW as a modulated CW, cause the second transmitter to transmit the modulated CW to the receiver via a loopback path, the receiver to combine the first received CW from the first transmitter and the modulated CW from the second transmitter into a combined CW, and a signal analyzer to, in response to obtaining the combined CW from the receiver, generate a performance characteristic of the radar circuit based on the combined CW.

Example 36 includes the apparatus of example 35, wherein the apparatus is to test the radar circuit at production of the radar circuit.

Example 37 includes the apparatus of example 35, wherein the CW is a signal with a frequency of about seventy-seven gigahertz.

Example 38 includes the apparatus of example 35, further including an alert generator to transmit a status signal to a device to cause the device to act on the radar circuit based on a quality of the performance characteristic.

Example 39 includes the apparatus of example 38, wherein when the status signal indicates that the radar circuit is to be removed from production, the device is to remove the radar circuit from production.

Example 40 includes the apparatus of example 35, wherein the performance characteristic includes a compression point of the receiver.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A radar circuit comprising:
a local oscillator (LO);
a transmitter coupled to the LO and configured to be coupled to a transmission network;
a receiver configured to be coupled to the transmission network; and
a controller coupled to the LO, the transmitter, and the receiver, wherein the controller is configured to:
cause the LO to generate a frequency modulated continuous waveform (FMCW);
cause the transmitter to modulate the FMCW to output a modulated FMCW;
cause the transmitter to transmit the modulated FMCW to the transmission network to obtain an output signal from the transmission network; and
cause the receiver to output a receiver FMCW in response to the output signal;
wherein the controller is further configured to compare the receiver FMCW with an expected FMCW for the receiver with respect to a performance characteristic of the radar circuit.

2. The radar circuit of claim 1, wherein the output signal has a functional relationship to the modulated FMCW with respect to the performance characteristic.

3. The radar circuit of claim 1, wherein the controller is configured to cause the transmitter to modulate the FMCW via a binary phase modulation.

4. The radar circuit of claim 1, wherein the FMCW is a signal that ramps from about seventy-seven gigahertz to about eighty-one gigahertz.

5. The radar circuit of claim 1, wherein the receiver is a first receiver, the receiver FMCW is a first receiver FMCW associated with the first receiver, and the expected FMCW is a first expected FMCW associated with the first receiver, the radar circuit further including a second receiver, a second receiver FMCW associated with the second receiver, and a second expected FMCW associated with the second receiver, and wherein:
the output signal of the transmission network is divided via a power divider of the transmission network into a first output signal and a second output signal;
the controller is configured to cause the first receiver to output the first receiver FMCW in response to the first output signal, and to cause the second receiver to output the second receiver FMCW in response to the second output signal; and
the controller is configured to compare the first receiver FMCW with the first expected FMCW and compare the second receiver FMCW with the second expected FMCW;
wherein the performance characteristic includes a characteristic from a group consisting of: a signal to noise ratio of the received FMCW at one of the first receiver or the second receiver, signal power of the received FMCW at one of the first receiver or the second receiver, and gain and phase mismatch between the first receiver and the second receiver.

6. The radar circuit of claim 5, wherein the controller is configured to transmit a status signal to a device to cause the device to act on the radar circuit based on a quality of the performance characteristic and when the status signal indicates that the radar circuit is configured to be removed from production, the device is configured to remove the radar circuit from production.

7. The radar circuit of claim 6, wherein the quality of the performance characteristic is based on a threshold value corresponding to a characteristic from a group consisting of:

a value of the signal to noise ratio, a value for the signal power, and a value for the gain and phase mismatch.

8. A method to test a radar circuit including an oscillator, a transmitter, and multiple receivers, the method comprising:
generating, by the oscillator, a frequency modulated continuous waveform (FMCW);
modulating, by the transmitter, the FMCW to produce a modulated FMCW;
transmitting, by the transmitter, the modulated FMCW to a transmission network;
processing, by the transmission network, the modulated FMCW to generate an internal signal;
outputting, by the transmission network, a receiver input signal for each of the multiple receivers based on the internal signal;
outputting, by each of the multiple receivers, a corresponding output signal based on the corresponding receiver input signal; and
comparing each output signal to an expected output signal for the corresponding receiver.

9. The method of claim 8, wherein the output signals of the multiple receivers are combined and transmitted to a controller for the comparing.

10. The method of claim 8, wherein the transmitter modulates the FMCW via a binary phase modulation.

11. The method of claim 8, wherein the FMCW is a signal that ramps from about seventy-seven gigahertz to about eighty-one gigahertz.

12. The method of claim 8, further comprising multiple transmitters including the transmitter, wherein the modulating includes modulating by each of the multiple transmitters, the FMCW to produce a corresponding modulated FMCW, the transmitting includes transmitting, by each of the multiple transmitters, the corresponding modulated FMCW to the transmission network, and the processing includes combining, by the transmission network, the corresponding modulated FMCW to generate the internal signal.

13. The method of claim 12, further including transmitting a status signal to a device to cause the device to act on the radar circuit based on a quality of a performance characteristic of the radar circuit and when the status signal indicates that the radar circuit is to be removed from production, the device is to remove the radar circuit from production.

14. The method of claim 13, wherein the quality of the performance characteristic is based on a threshold value corresponding to a characteristic from a group consisting of: a value of a signal to noise ratio of the receiver input signal at one of the multiple receivers, a value for a signal power of the receiver input signal at one of the multiple receivers, and a value for gain and phase mismatch between two of the multiple receivers.

15. An apparatus to test a radar circuit that includes an oscillator, a transmitter, and a receiver, the apparatus comprising:
a modulator manager configured to:
cause the oscillator to generate a frequency modulated continuous waveform (FMCW);
cause the transmitter to modulate the FMCW to output a modulated FMCW;
cause the transmitter to transmit the modulated FMCW via a transmission network to obtain an output signal from the transmission network;
cause the receiver output a receiver FMCW in response to the output signal; and
a signal analyzer configured to compare the receiver FMCW with an expected FMCW for the receiver with respect to a performance characteristic of the radar circuit.

16. The apparatus of claim 15, wherein the output signal has a functional relationship to the modulated FMCW with respect to the performance characteristic.

17. The apparatus of claim 15, wherein the modulator manager is to cause the transmitter to modulate the FMCW via a binary phase modulation.

18. The apparatus of claim 15, wherein the FMCW is a signal that ramps from about seventy-seven gigahertz to about eighty-one gigahertz.

19. The apparatus of claim 15, further including an alert generator to transmit a status signal to a device to act on the radar circuit based on a quality of the performance characteristic and when the status signal indicates that the radar circuit is to be removed from production, the device is to remove the radar circuit from production.

20. The apparatus of claim 15, wherein the performance characteristic includes a characteristic from a group consisting of: a signal to noise ratio of the receiver FMCW, and signal power of the receiver FMCW.

* * * * *